(12) United States Patent
Shimizu et al.

(10) Patent No.: US 11,316,449 B2
(45) Date of Patent: Apr. 26, 2022

(54) MOTOR DRIVING APPARATUS AND AIR CONDITIONER

(71) Applicant: Mitsubishi Electric Corporation, Tokyo (JP)

(72) Inventors: Yuichi Shimizu, Tokyo (JP); Kazunori Hatakeyama, Tokyo (JP); Keisuke Uemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/976,583

(22) PCT Filed: Apr. 2, 2018

(86) PCT No.: PCT/JP2018/014093
§ 371 (c)(1),
(2) Date: Aug. 28, 2020

(87) PCT Pub. No.: WO2019/193621
PCT Pub. Date: Oct. 10, 2019

(65) Prior Publication Data
US 2021/0006183 A1 Jan. 7, 2021

(51) Int. Cl.
*H02P 1/54* (2006.01)
*H02P 1/56* (2006.01)
*H02P 21/22* (2016.01)

(52) U.S. Cl.
CPC ............. *H02P 1/56* (2013.01); *H02P 21/22* (2016.02)

(58) Field of Classification Search
CPC .... H02P 1/56; H02P 21/22; H02P 1/00; H02P 21/00
See application file for complete search history.

(56) References Cited

U.S. PATENT DOCUMENTS

2005/0174076 A1 8/2005 Katanaya
2015/0207447 A1 7/2015 Sato

FOREIGN PATENT DOCUMENTS

JP 2005-229760 A 8/2005
JP 4305021 B2 7/2009
(Continued)

OTHER PUBLICATIONS

International Search Report of the International Searching Authority dated Jul. 3, 2018 for the corresponding International application No. PCT/JP2018/014093 (and English translation).

*Primary Examiner* — Karen Masih
(74) *Attorney, Agent, or Firm* — Posz Law Group, PLC

(57) ABSTRACT

Prior to starting of first and second synchronous motors, direct-current excitation is performed to pull in rotors of the synchronous motors to a designated position. In the direct-current excitation, a difference between a value of a direct current flowing through the first synchronous motor and a value of a direct current flowing through the second synchronous motor is reduced. For example, d-axis currents and q-axis currents corresponding to three-phase currents flowing through the motors are determined; a d-axis voltage command value for making one of the d-axis currents larger in absolute value equal to a d-axis current command value is determined, and a q-axis voltage command value for making one of the q-axis currents larger in absolute value equal to a q-axis current command value is determined; an inverter is driven using the determined d-axis voltage command value and q-axis voltage command value.

12 Claims, 32 Drawing Sheets

(56) References Cited

FOREIGN PATENT DOCUMENTS

| | | | |
|---|---|---|---|
| JP | 4906369 | B2 | 3/2012 |
| JP | 6035942 | B2 | 11/2016 |
| KR | 101537245 | B1 * | 7/2015 |

* cited by examiner

MOTOR DRIVING APPARATUS AND AIR CONDITIONER

CROSS REFERENCE TO RELATED APPLICATION

This application is a U.S. national stage application of International Patent Application No. PCT/JP2018/014093 filed on Apr. 2, 2018, the disclosure of which is incorporated herein by reference.

TECHNICAL FIELD

The present invention relates to a motor driving apparatus and an air conditioner.

BACKGROUND

Patent Literature 1 discloses a motor driving apparatus that drives multiple motors of an air conditioner. The motor driving apparatus disclosed in Patent Literature 1 drives multiple motors in parallel with a single inverter, and induction motors using no position sensors or permanent magnet synchronous motors using position sensors are used as the motors.

PATENT LITERATURE

Patent Literature 1: Japanese Patent No. 4305021 (FIG. 1)

As motors, permanent magnet synchronous motors have been increasingly used to improve performance, and in order to reduce the costs of driving apparatuses therefor, it is preferable to implement position sensorless drive.

In driving a permanent magnet synchronous motor without a position sensor, it is necessary to pull in a rotor of the motor to a desired phase, in order to generate an appropriate torque at the time of the starting, and it is known to perform direct-current excitation in which output voltages of respective phases of an inverter are set to values corresponding to the above desired phase and direct currents are passed through stator windings of the motor until the rotor is pulled in to the desired phase.

In driving multiple permanent magnet synchronous motors with a single inverter without a position sensor, there is the following problem. When direct-current excitation is performed in a state where the initial positions of the multiple motors are different, there is a possibility that surges occur in motor currents due to the difference in position between the motors, causing breakdown of switching elements of the inverter, demagnetization of the motors, or the like due to overcurrent.

SUMMARY

The present invention is intended to, in a driving apparatus that drives multiple permanent magnet synchronous motors, prevent surges in motor currents in performing direct-current excitation and prevent breakdown of switching elements of an inverter, demagnetization of the motors, or the like from occurring.

A motor driving apparatus of a first aspect of the present invention is a motor driving apparatus including:

an inverter to drive a first synchronous motor and a second synchronous motor each including a rotor; and a controller to control the inverter, wherein the controller pulls in the rotor of the first synchronous motor and the rotor of the second synchronous motor to a designated position by performing direct-current excitation prior to starting of the first synchronous motor and the second synchronous motor, and wherein a difference between a value of a direct current flowing through the first synchronous motor and a value of a direct current flowing through the second synchronous motor is reduced during the direct-current excitation.

A motor driving apparatus of a second aspect of the present invention includes:

an inverter to drive a first synchronous motor and a second synchronous motor each including a rotor; and a controller to control the inverter, wherein the controller pulls in the rotor of the first synchronous motor and the rotor of the second synchronous motor to a designated position by performing direct-current excitation prior to starting of the first synchronous motor and the second synchronous motor, wherein in performing the direct-current excitation, the controller determines a d-axis current and a q-axis current corresponding to three-phase currents flowing through one of the first and second synchronous motors, determines a d-axis voltage command value for making the d-axis current equal to a d-axis current command value, determines a q-axis voltage command value for making the q-axis current equal to a q-axis current command value, converts the d-axis voltage command value and the q-axis voltage command value to three-phase voltage command values, and controls the inverter to make output voltages of the inverter equal to the three-phase voltage command values, and wherein at least one of the d-axis current command value and the q-axis current command value increases gradually.

With the present invention, even when the initial positions of multiple motors are different, it is possible to prevent surges in motor currents in performing direct-current excitation and reduce the possibilities of breakdown of switching elements of an inverter, demagnetization of the motors, or the like.

DETAILED DESCRIPTION

Motor driving apparatuses of the present invention are for driving multiple permanent magnet synchronous motors. The following describes cases where the number of driven permanent magnet synchronous motors is two. Hereinafter, permanent magnet synchronous motors may be referred to simply as "motors".

First Embodiment

Figure 1:
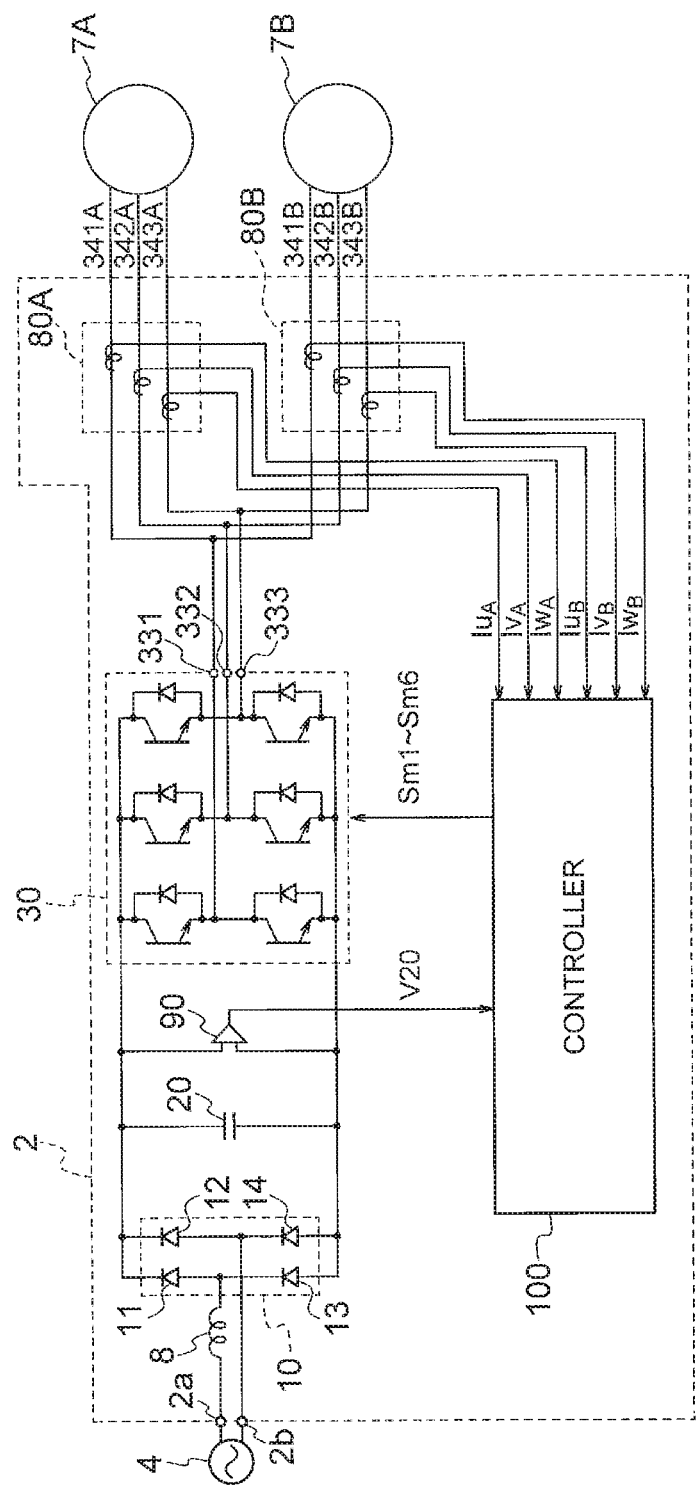
FIG. 1 is a schematic wiring diagram illustrating a motor driving apparatus of a first embodiment of the present invention together with two motors.

FIG. 1 is a schematic wiring diagram illustrating a motor driving apparatus 2 of a first embodiment of the present invention together with two motors 7A and 7B. Hereinafter, for distinction, the motor 7A may be referred to as the first motor, and the motor 7B may be referred to as the second motor.

Figure 2:
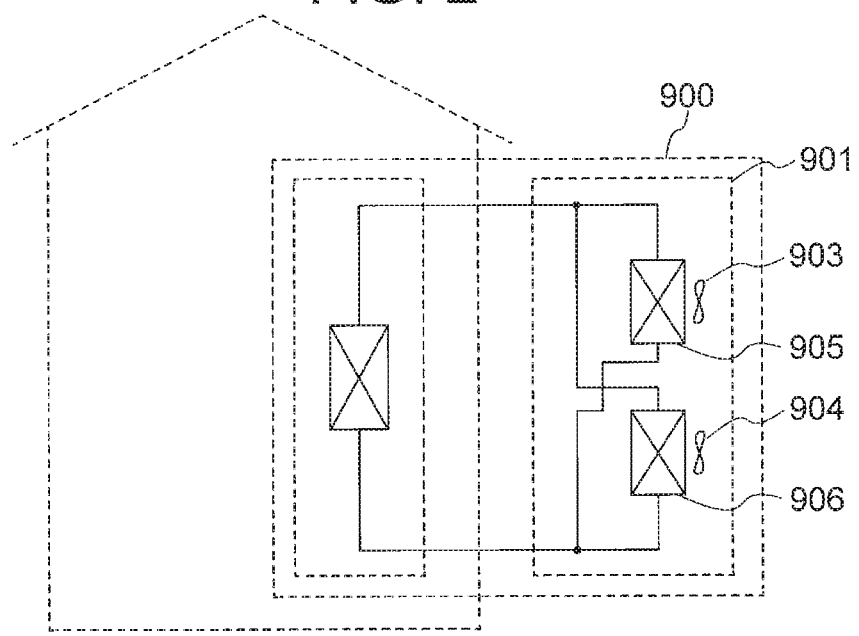
FIG. 2 is a schematic diagram illustrating an air conditioner including fans driven by the motors of FIG. 1.

The first and second motors 7A and 7B are for driving first and second fans 903 and 904 of an outdoor unit 901 of an air conditioner 900, as illustrated in FIG. 2, for example. The first and second fans 903 and 904 are provided for the first and second heat exchangers 905 and 906, for example.

The illustrated motor driving apparatus 2 is for driving the motors 7A and 7B, and includes alternating-current (AC) power input terminals 2a and 2b, a reactor 8, a rectifier circuit 10, a capacitor 20, an inverter 30, first and second three-phase current detectors 80A and 80B, a voltage detector 90, and a controller 100.

The controller 100 may be formed by a microcomputer (e.g., including a central processing unit (CPU)), a digital signal processor (DSP), or the like, or may be formed by dedicated hardware. The following description assumes that it is formed by a microcomputer.

The AC power input terminals 2a and 2b are connected to an external AC power supply 4, and the AC power input terminals 2a and 2b are applied with an AC voltage from the AC power supply 4.

The rectifier circuit 10 receives AC power from the AC power supply 4 via the input terminals 2a and 2b and the reactor 8, and rectifies the AC power. The rectifier circuit 10 is a full-wave rectifier circuit formed by bridge connection of rectifier elements 11 to 14, such as diodes.

The capacitor 20 smoothes a direct-current (DC) voltage obtained by rectification by the rectifier circuit 10 and outputs a DC voltage V20.

Figure 3:
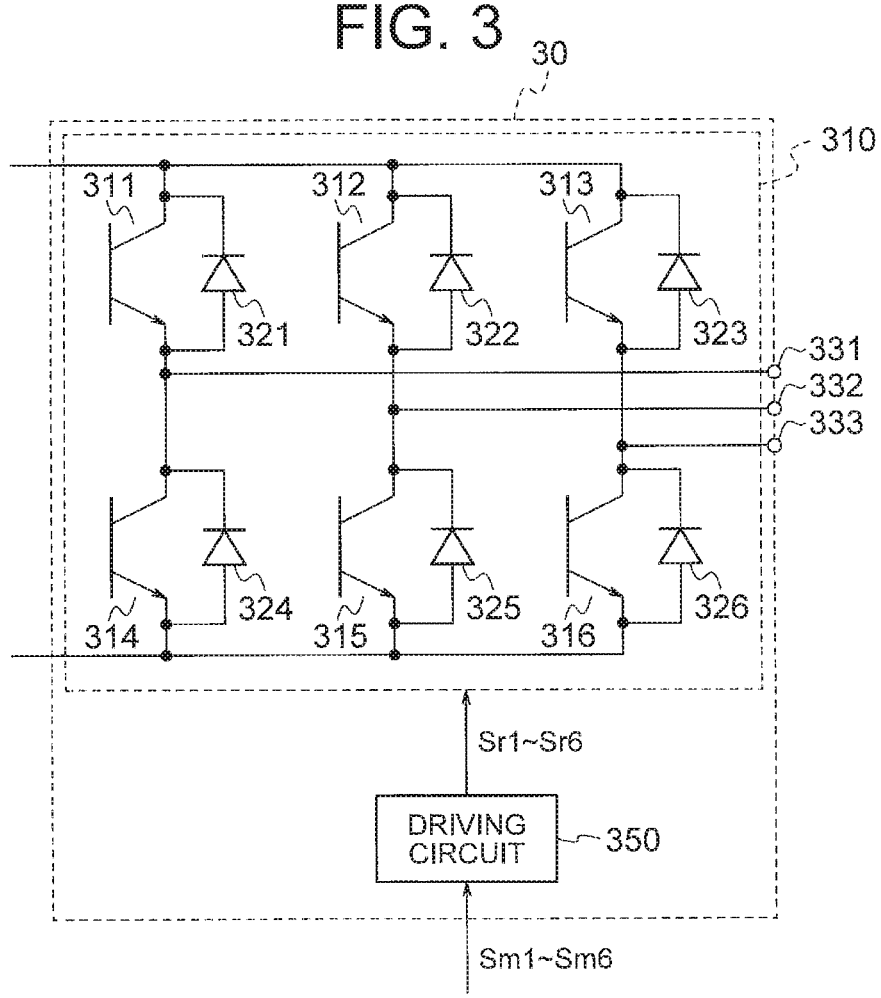
FIG. 3 is a diagram illustrating a configuration of an inverter of FIG. 1.

The inverter 30 includes an inverter main circuit 310 and a driving circuit 350, as illustrated in FIG. 3, and input terminals of the inverter main circuit 310 are connected to electrodes of the capacitor 20.

Lines connecting the outputs of the rectifier circuit 10, the electrodes of the capacitor 20, and the input terminals of the inverter main circuit 310 are referred to as DC bus lines.

The inverter 30 is controlled by the controller 100 so that switching elements 311 to 316 of six arms of the inverter main circuit 310 are turned on and off to generate three-phase AC currents of variable frequency and variable voltage and supply them to the motors 7A and 7B. Freewheeling rectifier elements 321 to 326 are connected in parallel to the switching elements 311 to 316.

The motors 7A and 7B are driven in parallel by the inverter 30, and connected in parallel to inverter output terminals 331, 332, and 333.

The three-phase current detector 80A detects currents $Iu_A$, $Iv_A$, and $Iw_A$ flowing through lines 341A, 342A, and 343A connecting the inverter output terminals 331, 332, and 333 and the motor 7A.

The three-phase current detector 80B detects currents $Iu_B$, $Iv_B$, and $Iw_B$ flowing through lines 341B, 342B, and 343B connecting the inverter output terminals 331, 332, and 333 and the motor 7B.

The currents $Iu_A$, $Iv_A$, $Iw_A$, $Iu_B$, $Iv_B$, and $Iw_B$ detected by the three-phase current detectors 80A and 80B are converted to digital signals by an A/D converter (not illustrated) in the controller 100, and used in processing in the controller 100.

The voltage detector 90 detects the DC voltage input to the inverter 30, i.e., the voltage V20 between the terminals of the capacitor. The voltage V20 detected by the voltage detector 90 is converted to a digital signal by an A/D converter (not illustrated) in the controller 100, and used in processing in the controller 100.

The controller 100 controls the magnitude and frequency of the output voltage of the inverter 30 based on the two sets of detected three-phase currents $Iu_A$, $Iv_A$, and $Iw_A$, and $Iu_B$, $Iv_B$, and $Iw_B$ and the input voltage V20 of the inverter 30 detected by the voltage detector 90. To control the inverter 30, the controller 100 generates PWM signals Sm1 to Sm6 and supplies them to the inverter 30.

The inverter 30 includes, besides the inverter main circuit 310, the driving circuit 350, as described above. The driving circuit 350 generates drive signals Sr1 to Sr6 based on the PWM signals Sm1 to Sm6 and controls turning on and off of the switching elements 311 to 316 by using the drive signals Sr1 to Sr6, thereby applying the three-phase AC voltage of variable frequency and variable voltage to the motors 7.

The PWM signals Sm1 to Sm6 have a magnitude (0 to 5 V) of a signal level of a logic circuit, whereas the drive signals Sr1 to Sr6 have a magnitude of a voltage level, e.g., +15 V to −15 V, required to control the switching elements 311 to 316. Also, the PWM signals Sm1 to Sm6 have the ground potential of the controller 100 as a reference potential, whereas the drive signals Sri to Sr6 each have the potential of a negative terminal (emitter terminal) of the corresponding switching element as a reference potential.

The controller 100 performs control in normal rotation (rotation after the starting) of the motors, and further performs a starting process in starting of the motors. In the starting process, it performs an operation of pulling in a rotor of each motor to a designated position by performing direct-current excitation in which DC currents are passed through stator windings of the motors 7A and 7B.

Figure 4:
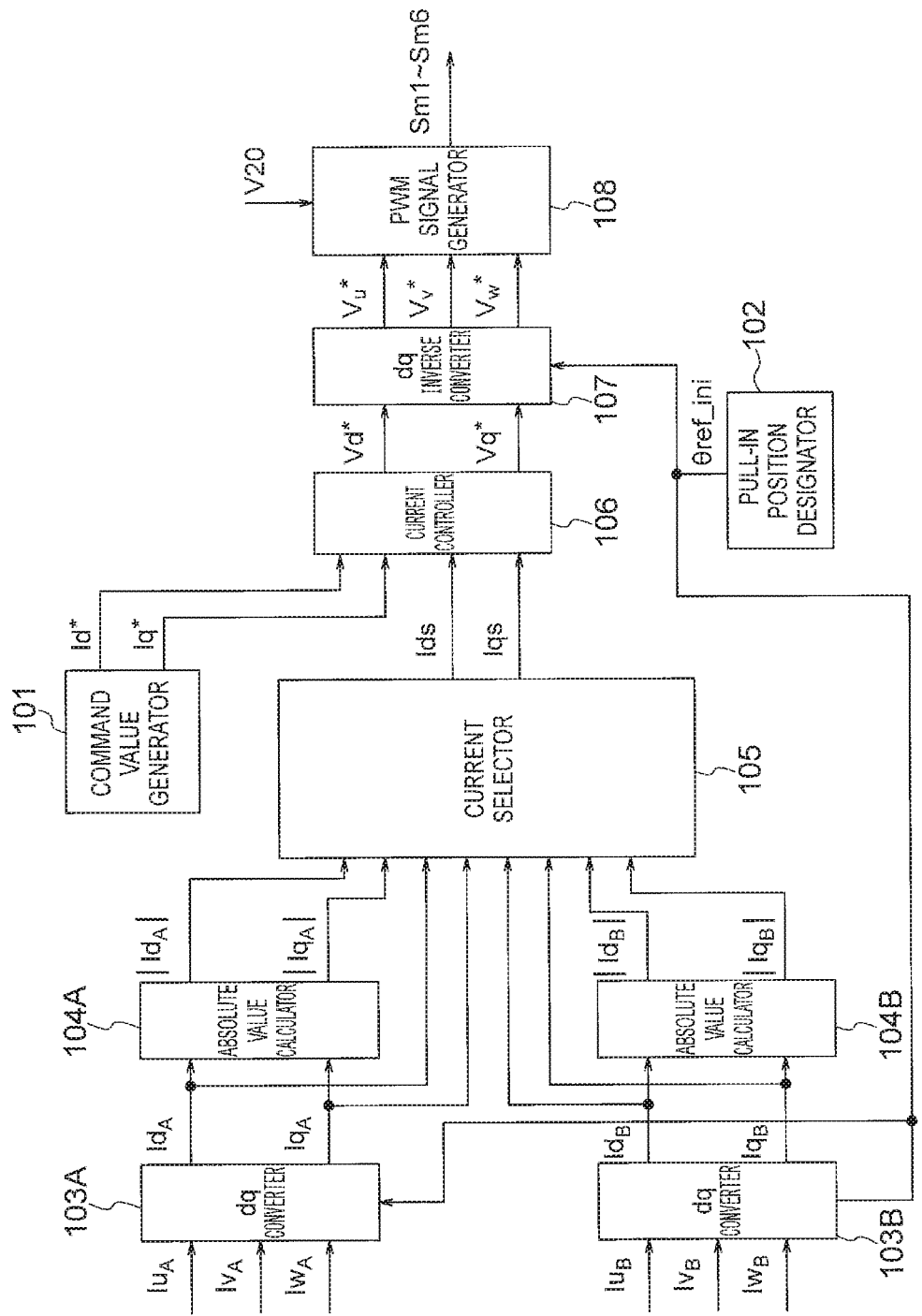
FIG. 4 is a block diagram illustrating a controller of FIG. 1.

FIG. 4 illustrates the controller 100. FIG. 4 illustrates a part of the controller 100 that performs control at the time of the starting. As illustrated, the controller 100 includes a command value generator 101, a pull-in position designator 102, first and second dq converters 103A and 103B, first and second absolute value calculators 104A and 104B, a current selector 105, a current controller 106, a dq inverse converter 107, and a PWM signal generator 108.

Figure 5:
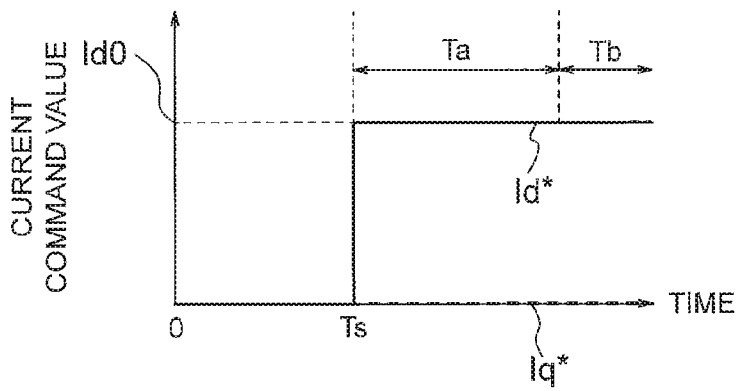
FIG. 5 is a chart illustrating an example of a d-axis current command value and a q-axis current command value generated by a command value generator of FIG. 4.

The command value generator 101 outputs, as a d-axis current command value Id* and a q-axis current command value Iq*, ones illustrated in FIG. 5. In the example illustrated in FIG. 5, the q-axis current command value Iq is fixed at zero, and the d-axis current command value Id* increases from zero to a predetermined value Id0 in a stepwise manner at the time Ts of the start of the pull-in.

The pull-in position designator 102 designates a pull-in position by outputting information indicating a target pull-in position θref_ini.

The first dq converter 103A converts the three-phase currents $Iu_A$, $Iv_A$, and $Iw_A$ of the motor 7A, which are obtained through the detection by the current detector 80A and the conversion to the digital signals by the A/D converter (not illustrated), to a d-axis current $Id_A$ and a q-axis current $Iq_A$ on a dq-axis coordinate system at the target pull-in position θref_ini.

Similarly, the second dq converter 103B converts the three-phase currents $Iu_B$, $Iv_B$, and $Iw_B$ of the motor 7B, which are obtained through the detection by the current detector 80B and the conversion to the digital signals by the A/D converter (not illustrated), to a d-axis current $Id_B$ and a q-axis current $Iq_B$ on a dq-axis coordinate system at the target pull-in position.

For the dq conversion in the first and second dq converters 103A and 103B, dq conversion equations commonly used in motor control may be used.

The first absolute value calculator 104A calculates an absolute value $|Id_A|$ of the d-axis current of the motor 7A and an absolute value $|Iq_A|$ of the q-axis current of the motor 7A.

The second absolute value calculator 104B calculates an absolute value $|Id_B|$ of the d-axis current of the motor 7B and an absolute value $|Iq_B|$ of the q-axis current of the motor 7B.

The current selector 105 receives the d-axis currents $Id_A$ and $Id_B$, the q-axis currents $Iq_A$ and $Iq_B$, the absolute values $|Id_A|$ and $|Id_B|$ of the d-axis currents, and the absolute values $|Iq_A|$ and $|Iq_B|$ of the q-axis currents, and selects and outputs one of the d-axis currents $Id_A$ and $Id_B$ that is larger in absolute value than the other of the d-axis currents, and selects and outputs one of the q-axis currents $Iq_A$ and $Iq_B$ that is larger in absolute value than the other of the q-axis currents.

Specifically, the current selector 105 compares the absolute value $|Id_A|$ and the absolute value $|Id_B|$ to select and output the d-axis current corresponding to the larger of the absolute values, as a selected d-axis current Ids, and compares the absolute value $|Iq_A|$ and the absolute value $|Iq_B|$ to select and output the q-axis current corresponding to the larger of the absolute values, as a selected q-axis current Iqs.

The dq conversion, the calculation of the absolute values, the comparison between the absolute values, and the selection of the currents Id and Iq as described above are performed every control period, and the currents Ids and Iqs are input to the current controller 106 (described below) every control period. The control period may be equal to or different from the sampling period of the currents flowing through the motors 7A and 7B.

Figure 6:
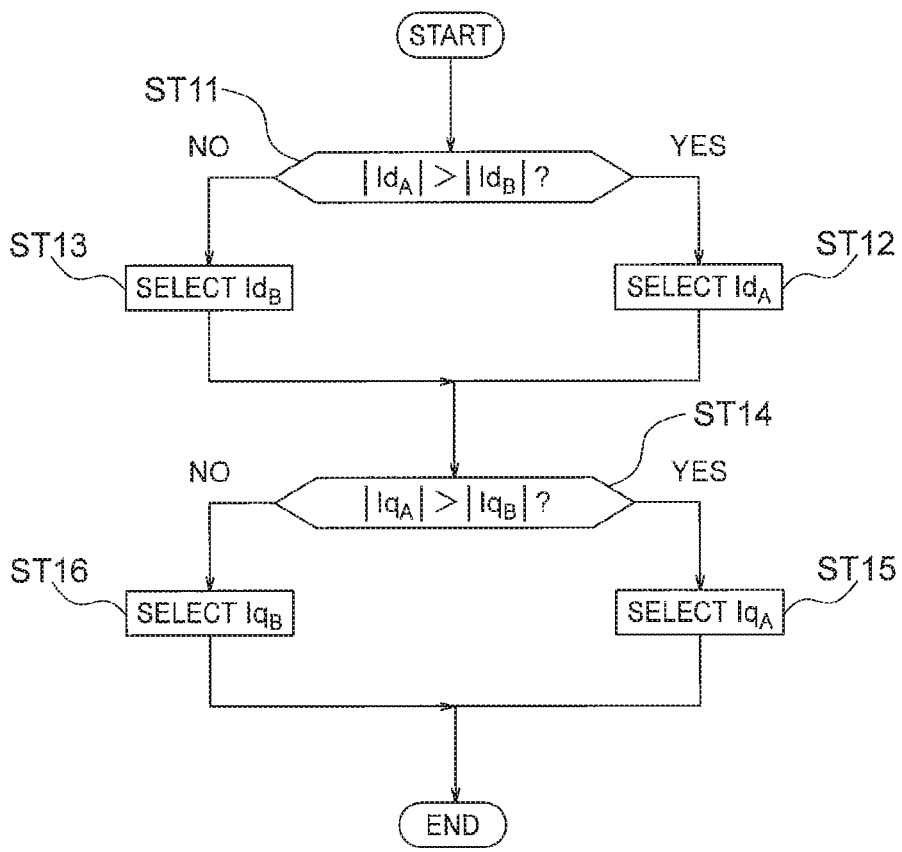
FIG. 6 is a flowchart illustrating a procedure of a process of current selection by a current selector of FIG. 4.

The process performed by the current selector 105 every control period is performed, for example, according to the procedure illustrated in FIG. 6.

In step ST11, the absolute value $|Id_A|$ and the absolute value $|Id_B|$ are compared, and when the absolute value $|Id_A|$ is larger, the process proceeds to step ST12. Otherwise, the process proceeds to step ST13.

In step ST12, the current $Id_A$ is selected and output as the selected current Ids.

In step ST13, the current $Id_B$ is selected and output as the selected current Ids.

Subsequent to step ST12 or ST13, the process proceeds to step ST14.

In step ST14, the absolute value $|Iq_A|$ and the absolute value $|Iq_B|$ are compared, and when the absolute value $|Iq_A|$ is larger, the process proceeds to step ST15. Otherwise, the process proceeds to step ST16.

In step ST15, the current $Iq_A$ is selected and output as the selected current Iqs.

In step ST16, the current $Iq_B$ is selected and output as the selected current Iqs.

Upon completion of step ST15 or ST16, the process at the control period ends.

The current controller 106 outputs a d-axis voltage command value Vd* to make the d-axis current Ids (=$Id_A$ or $Id_B$) output from the current selector 105 equal to the d-axis current command value Id*, and outputs a q-axis voltage command value Vq* to make the q-axis current Iqs (=$Iq_A$ or $Iq_B$) output from the current selector 105 equal to the q-axis current command value Iq*.

The current controller 106 may perform commonly used proportional-integral (PI) control, for example.

The dq inverse converter 107 receives a signal indicating the target pull-in position θref_ini output from the pull-in position designator 102 and signals indicating the d-axis voltage command value Vd* and q-axis voltage command value Vq* output from the current controller 106, and converts the d-axis voltage command value Vd* and q-axis voltage command value Vq* to three-phase voltage command values $V_u^*$, $V_v^*$, and $V_w^*$.

The PWM signal generator 108 receives the three-phase voltage command values $V_u^*$, $V_v^*$, and $V_w^*$ output from the dq inverse converter 107 and the input voltage V20 of the inverter 30 detected by the voltage detector 90, determines the PWM signals Sm1 to Sm6 for causing voltages equal to the three-phase voltage command values $V_u^*$, $V_v^*$, and $V_w^*$ to be output, and outputs them to the inverter 30.

The above control is performed every control period. By repeating the above control for a period of time sufficient for the pull-in, it is possible to perform direct-current excitation in which DC currents are passed through the stator windings of the motors 7A and 7B, and pull in the rotor of each motor in such a manner that a magnetic pole position of each motor coincides with the target pull-in position θref_ini.

The controller 100 used in this embodiment is characterized in that it includes the absolute value calculators 104A and 104B and the current selector 105 as illustrated in FIG. 4. Advantages of this embodiment will be described below.

For comparison, a controller 100a that does not include the absolute value calculators 104A and 104B and the current selector 105 will be described with reference to FIG. 7.

Figure 7:
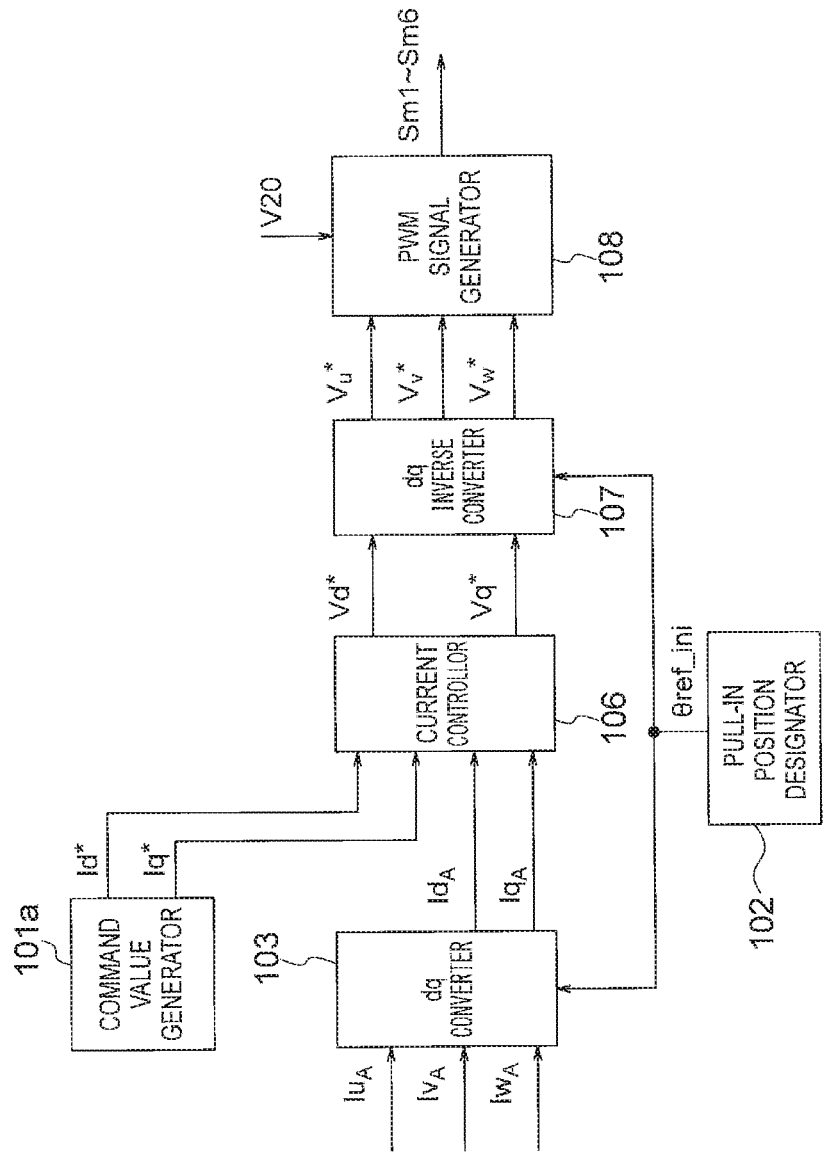
FIG. 7 is a block diagram illustrating a controller that does not include absolute value calculators and the current selector of FIG. 4.

The controller 100a illustrated in FIG. 7 is generally the same as the controller 100 illustrated in FIG. 4, but is not provided with the absolute value calculators 104A and 104B and the current selector 105 of FIG. 4, and is provided with a single dq converter 103 instead of the first and second dq converters 103A and 103B.

When the controller 100a illustrated in FIG. 7 is used, it is sufficient that only one of the current detectors 80A and 80B illustrated in FIG. 1 be provided in the motor driving apparatus. Hereinafter, it is assumed that only the current detector 80A is provided.

The dq converter 103 converts the currents $Iu_A$, $Iv_A$, and $Iw_A$ detected by the current detector 80A to a d-axis current Id and a q-axis current Iq.

The current controller 106 generates a d-axis voltage command value Vd* and a q-axis voltage command value Vq*, based on the d-axis current Id and q-axis current Iq output from the dq converter 103 and the d-axis current command value Id* and q-axis current command value Iq* supplied from the command value generator 101a.

Except for the above, the controller 100a of FIG. 7 is the same as the controller 100 of FIG. 4.

FIGS. 8A to 8H illustrate an example of the behavior of the motor currents (three-phase currents) and the behavior of the motor magnetic pole positions in the case of using the controller 100 illustrated in FIG. 4 and providing the d-axis current command value Id* that increases to the predetermined value Id0 in a stepwise manner as illustrated in FIG. 5, and FIGS. 9A to 9F illustrate the behavior of the d-axis currents and q-axis currents corresponding to the above motor currents.

Also, FIGS. 10A to 10H illustrate an example of the behavior of the motor currents (three-phase currents) and the behavior of the motor magnetic pole positions in the case of using the controller 100a illustrated in FIG. 7 and performing the same control, and FIGS. 11A to 11F illustrate the behavior of the d-axis currents and q-axis currents corresponding to the above motor currents.

In FIGS. 5, 8A to 8H, 9A to 9F, 10A to 10H, and 11A to 11F, Ta indicates a period during which the direct-current excitation is performed, and Tb indicates a rotation period following the direct-current excitation.

Figure 8A:
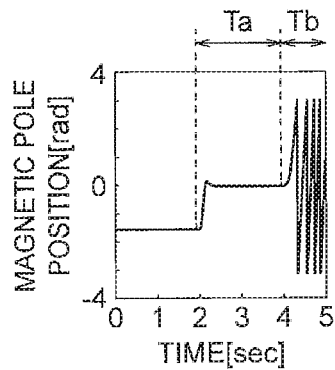
FIGS. 8A to 8H are charts illustrating an example of the behavior of motor currents and the behavior of motor magnetic pole positions in the case of using the controller of FIG. 4.
Figure 10A:
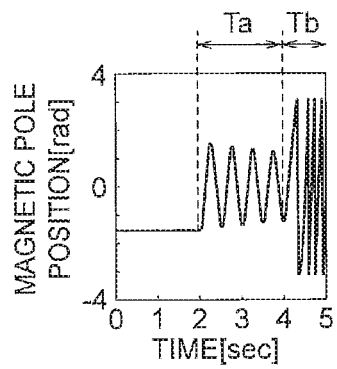
FIGS. 10A to 10H are charts illustrating an example of the behavior of motor currents and the behavior of motor magnetic pole positions in the case of using the controller of FIG. 7.

FIG. 8A and FIG. 10A illustrate the magnetic pole position (rad) of the motor 7A.

Figure 8E:
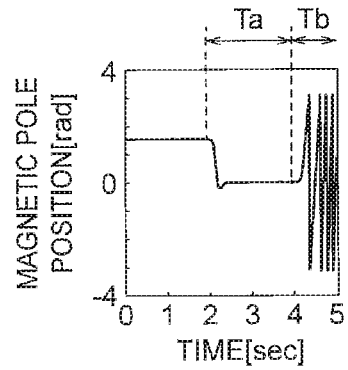
Figure 8B:
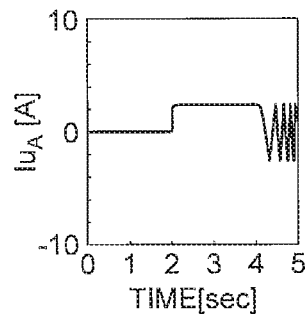
Figure 8F:
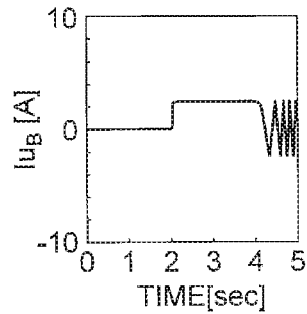
Figure 8C:
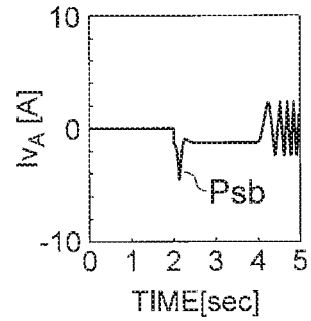
Figure 8G:
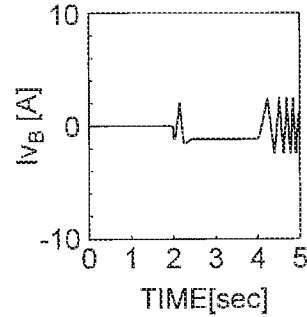
Figure 8D:
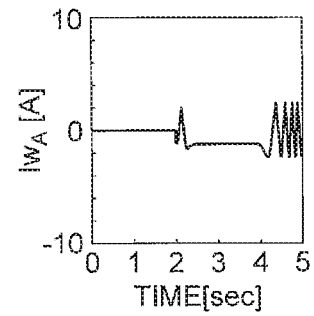
Figure 8H:
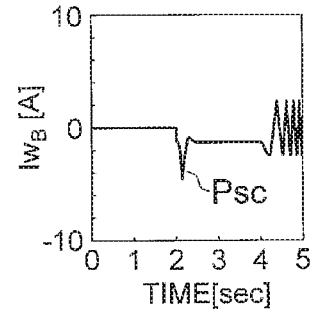
Figure 10E:
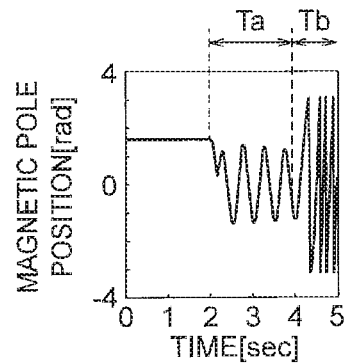
Figure 10B:
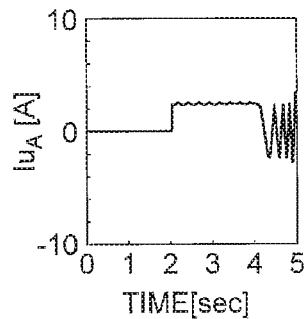
Figure 10F:
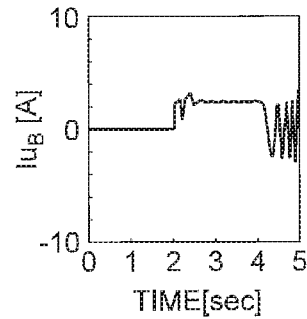
Figure 10C:
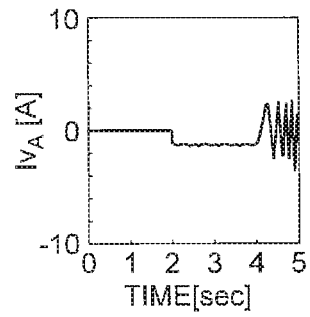
Figure 10G:
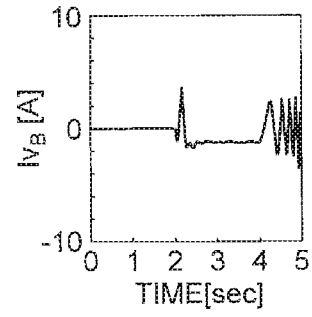
Figure 10D:
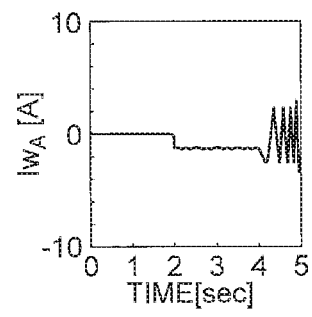

FIG. 8E and FIG. 10E illustrate the magnetic pole position (rad) of the motor 7B.

FIGS. 8B to 8D and FIGS. 10B to 10D illustrate the currents $Iu_A$, $Iv_A$, and $Iw_A$ of the U-, V-, and W-phases of the motor 7A.

FIGS. 8F to 8H and FIGS. 10F to 10H illustrate the currents $Iu_B$, $Iv_B$, and $Iw_B$ of the U-, V-, and W-phases of the motor 7B.

Figure 9A:
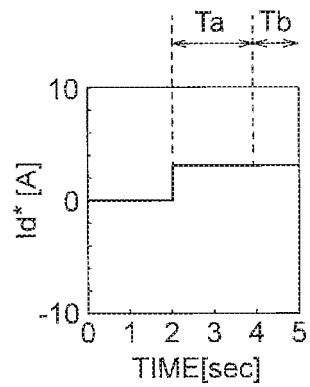
FIGS. 9A to 9F are charts illustrating an example of the behavior of d-axis currents and q-axis currents corresponding to the motor currents in the case of using the controller of FIG. 4, together with the d-axis current command value and q-axis current command value.
Figure 9D:
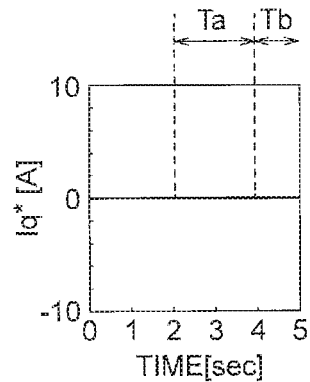
Figure 9B:
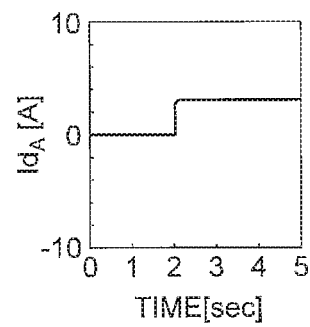
Figure 9E:
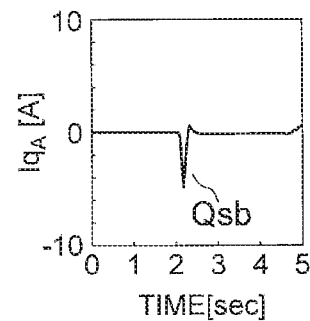
Figure 9C:
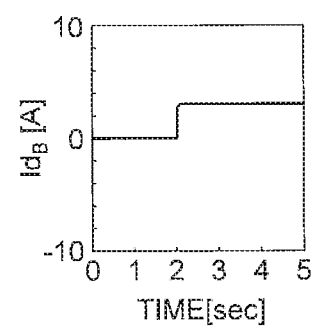
Figure 9F:
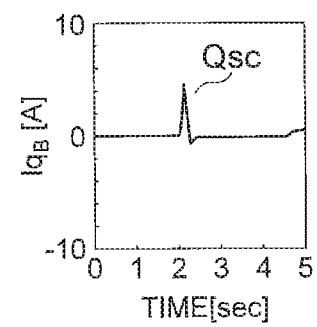
Figure 11A:
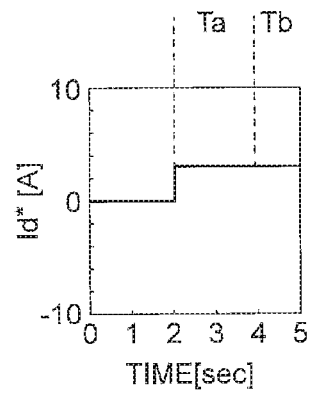
FIGS. 11A to 11F are charts illustrating an example of the behavior of d-axis currents and q-axis currents corresponding to the motor currents in the case of using the controller of FIG. 7, together with the d-axis current command value and q-axis current command value.
Figure 11D:
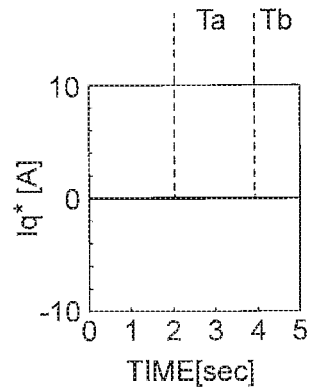
Figure 11B:
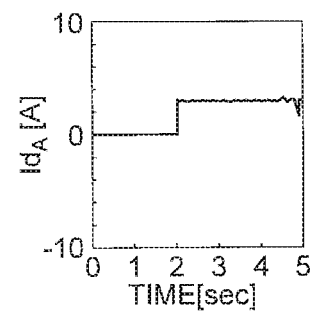
Figure 11E:
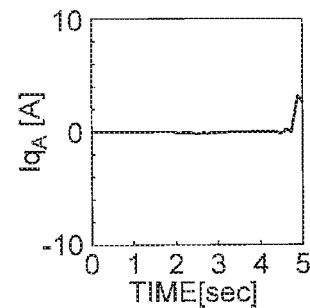
Figure 11C:
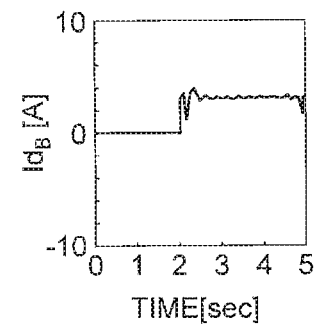
Figure 11F:
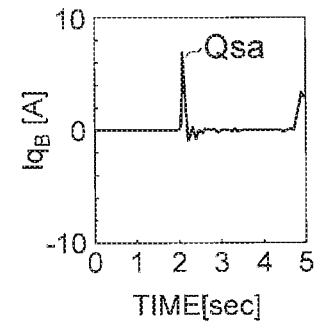

FIGS. 9A and 9D and FIGS. 11A and 11D illustrate current command values that are the same as those illustrated in FIG. 5. Specifically, FIG. 9A and FIG. 11A illustrate the d-axis current command value Id*, and FIG. 9D and FIG. 11D illustrate the q-axis current command value Iq*.

FIGS. 9B and 9E and FIGS. 11B and 11E illustrate the d-axis current $Id_A$ and q-axis current $Iq_A$ of the motor 7A.

FIGS. 9C and 9F and FIGS. 11C and 11F illustrate the d-axis current $Id_B$ and q-axis current $Iq_B$ of the motor 7B.

To facilitate understanding of effects of the embodiment, FIGS. 8A to 8H, FIGS. 9A to 9F, FIGS. 10A to 10H, and FIGS. 11A to 11F illustrate the behavior in a case where the initial magnetic pole position of the motor 7A is −π/2 rad (−90 degrees), the initial magnetic pole position of the motor 7B is +π/2 rad (+90 degrees), and they are pulled in from the above state to 0 rad (in a case where θref_ini is 0 rad).

During the period Ta of the direct-current excitation, given DC voltages are applied from the inverter 30. In the case of pull-in to 0 rad, a positive voltage (denoted by +Va) is output from the U-phase, and a negative voltage (−Va/2) whose magnitude is half that of the voltage output from the U-phase is output from the V-phase and the W-phase.

Figure 10H:
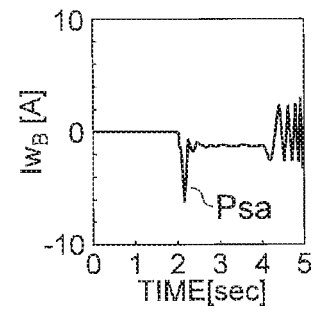

In the case of the controller 100a of FIG. 7, during the direct-current excitation period Ta (during the motor position pull-in control), a peak Psa of the three-phase currents of the motor 7B exceeds −6 A as illustrated in FIG. 10H, and corresponding to this, a peak (Qsa in FIG. 11F) of the q-axis current $Iq_B$ has a large value.

On the other hand, in the case of the controller 100 of FIG. 4, peaks Psb and Psc of the three-phase currents are about −5 A as illustrated in FIGS. 8B to 8D and FIGS. 8F to 8H, and the corresponding peaks (Qsb in FIG. 9E and Qsc in FIG. 9F) of the q-axis currents $Iq_A$ and $Iq_B$ are also relatively small.

This shows that the use of the controller 100 of FIG. 4 can reduce current surges.

Also, in the case of the controller 100a of FIG. 7, the magnetic pole positions of the motors vibrate and the pull-in is insufficient, as illustrated in FIGS. 10A and 10E. On the other hand, in the case of the controller 100 of FIG. 4, they become close to 0 rad in a short time, as illustrated in FIGS. 8A and 8E. This shows that the use of the controller 100 of FIG. 4 improves the performance of pull-in of the magnetic pole positions.

Further, in the case of the controller 100a of FIG. 7, as can be seen from FIGS. 10B to 10D and 10F to 10H and FIGS. 11B, 11C, 11E, and 11F, current surges are concentrated in the motor 7B side, whereas in the case of the controller 100 of FIG. 4, the currents flowing through the motor 7A and the currents flowing through the motor 7B can be made comparable. For example, in FIGS. 8B to 8D and 8F to 8H, control can be performed so that the current $Iu_A$ and the current $Iu_B$ are comparable, the current $Iv_A$ and the current $Iw_B$ are comparable, the current $Iw_A$ and the current $Iv_B$ are comparable. Thus, by performing the control of the present embodiment, differences between the values of the DC currents flowing through the synchronous motor 7A and the values of the DC currents flowing through the synchronous motor 7B are reduced. This provides an advantage that it is possible to make the risks of overheat, demagnetization, or the like of the motor 7A comparable to those of the motor 7B.

A reason why the currents flowing through the motor 7A and the currents flowing through the motor 7B can be made comparable will be described below with reference to FIGS. 12 to 23.

In FIGS. 12, 13, 16, 17A, 17B, 18, 19, 22, and 23, U, V, and W indicate the positions (directions) of a U-phase winding, a V-phase winding, and a W-phase winding, or a U-axis, a V-axis, and a W-axis, respectively.

First, a case where direct-current excitation is performed only on the first motor 7A will be described with reference to FIGS. 12 to 15.

Figure 12:
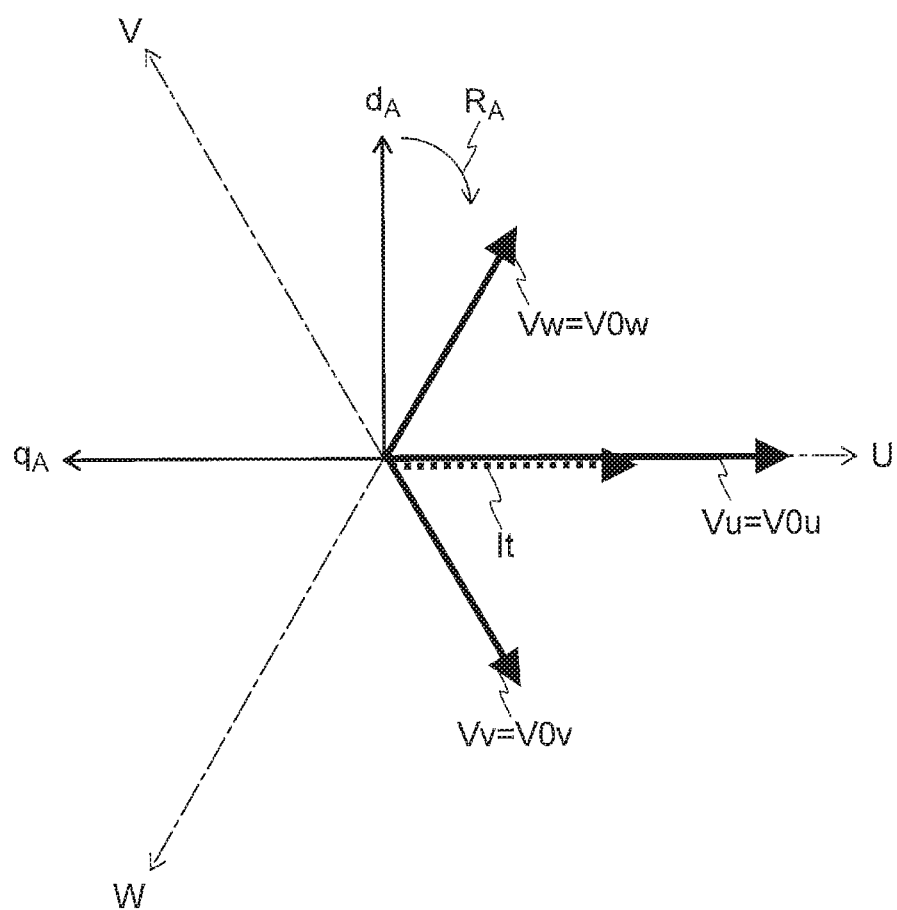
FIG. 12 is a vector diagram illustrating output voltages of respective phases of the inverter, a resultant current, and the direction of rotation of a first motor due to the resultant current in a case where a target pull-in position is 0 degrees and an initial phase of the first motor is 90 degrees.

In FIG. 12, $d_A$ indicates a d-axis (the position (direction) of a north pole of a permanent magnet) of the motor 7A, and $q_A$ indicates a q-axis of the motor 7A. The q-axis $q_A$ is 90 degrees ahead of the d-axis $d_A$.

The position of the d-axis $d_A$ is represented by a lead angle from its reference position (the position of the U-phase winding).

In the example of FIG. 12, it is assumed that the position (initial position or initial phase) of the d-axis $d_A$ at the time of start of the direct-current excitation is 90 degrees (π/2 rad).

When the d-axis $d_A$ of the motor 7A is made to coincide with the position of the U-phase winding by the direct-current excitation, i.e., when the target pull-in position θref_ini is 0 degrees, the U-phase output voltage Vu, V-phase output voltage Vv, and W-phase output voltage Vw illustrated in FIG. 12 are output from the inverter 30. Vu is a positive value, Vv and Vw are negative values, and the magnitudes of Vv and Vw are half that of Vu. The direction of the resultant current (vector) It of the U-phase current $Iu_A$, the V-phase current $Iv_A$, and the W-phase current $Iw_A$ due to the voltages Vu, Vv, and Vw coincides with the direction of the U-phase winding.

Due to the magnetic field due to this current, the d-axis $d_A$ of the motor 7A is attracted to the direction of the U-phase winding as indicated by arrow $R_A$, and the rotor rotates.

Figure 13:
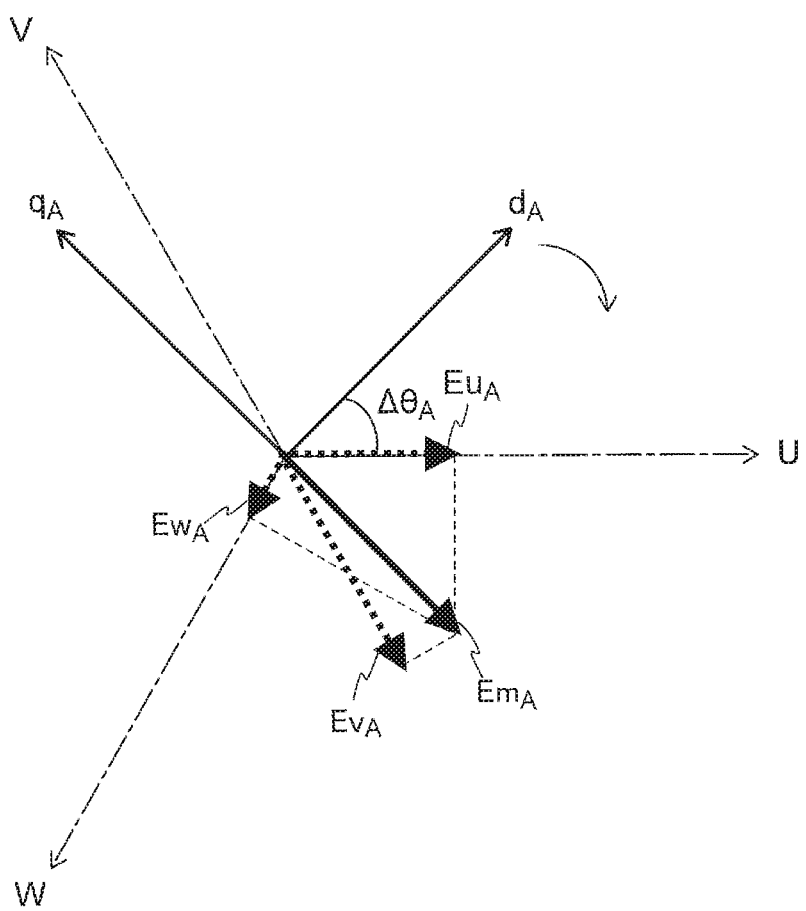
FIG. 13 is a vector diagram illustrating induced voltages due to rotation of the first motor.

When effects of inductance components are neglected for simplicity, an induced voltage $Em_A$ occurring on the q-axis $q_A$ due to the rotation of the motor 7A and the U-phase component $Eu_A$, V-phase component $Ev_A$, and W-phase component $Ew_A$ of the induced voltage $Em_A$ are as illustrated in FIG. 13.

The magnitude of the induced voltage $Em_A$ is proportional to the rotational speed of the rotor, and the respective magnitudes of the U-phase component $Eu_A$, V-phase component $Ev_A$, and W-phase component $Ew_A$ vary with change in the lead angle (motor phase) of the d-axis $d_A$.

Figure 14A:
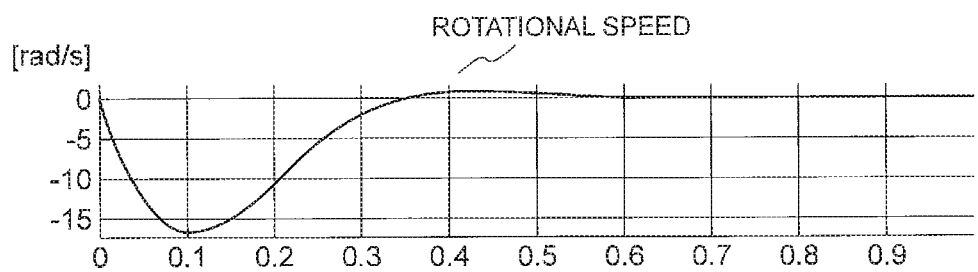
FIGS. 14A to 14E are waveform charts illustrating the operation when the first motor is pulled in from the state illustrated in FIG. 12 to the target pull-in position on the assumption that current control is not performed.
Figure 14B:
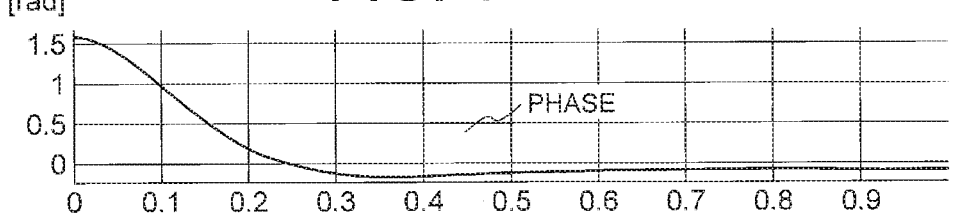
Figure 14C:
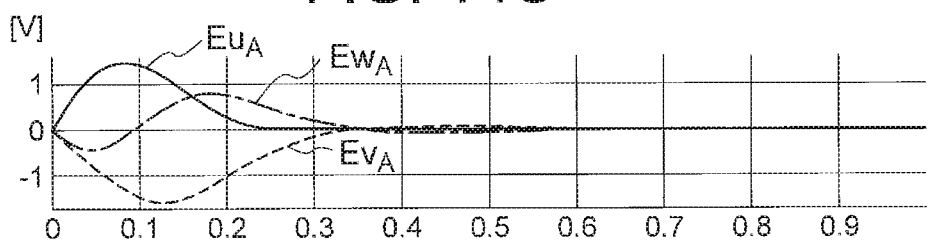
Figure 14D:
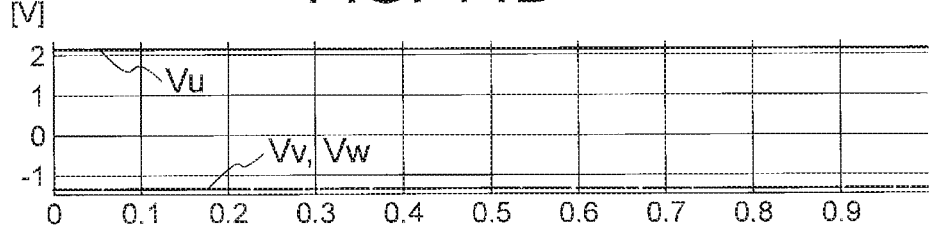
Figure 14E:
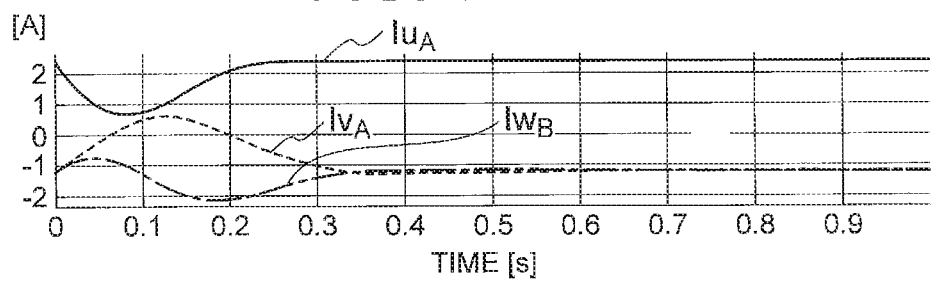

When the current control by the current controller 106 is not performed, the currents flowing through the respective phase windings of the motor 7A depend on the differences between the output voltages of the respective phases of the inverter 30 and the induced voltages of the respective phases of the motor 7A. FIGS. 14A to 14E illustrate an example of the operation when the motor 7A is pulled in to the target pull-in position from the state illustrated in FIG. 12. FIG. 14A illustrates the rotational speed of the motor 7A, FIG. 14B illustrates the phase of the motor 7A, FIG. 14C illustrates the U-phase induced voltage $Eu_A$, V-phase induced voltage $Ev_A$, and W-phase induced voltage $Ew_A$ of the motor 7A, FIG. 14D illustrates the U-phase output voltage Vu, V-phase output voltage Vv, and W-phase output voltage Vw of the inverter 30, and FIG. 14E illustrates the U-phase current $Iu_A$, V-phase current $Iv_A$, and W-phase current $Iw_A$ of the motor 7A.

Figure 15A:
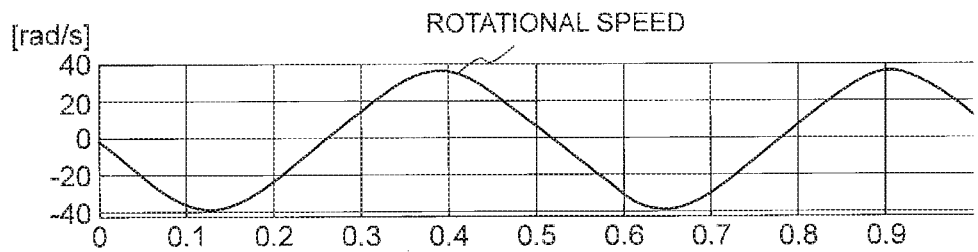
FIGS. 15A to 15E are waveform charts illustrating the operation when the first motor is pulled in from the state illustrated in FIG. 12 to the target pull-in position in a case where current control is performed.
Figure 15B:
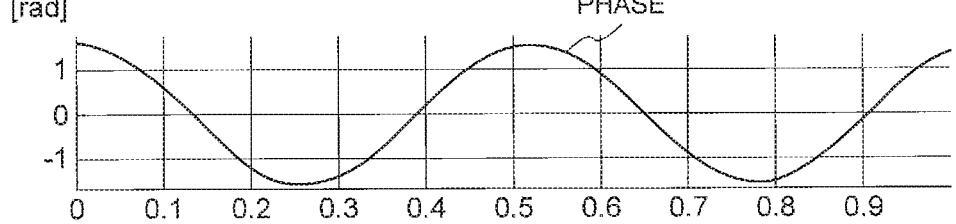
Figure 15C:
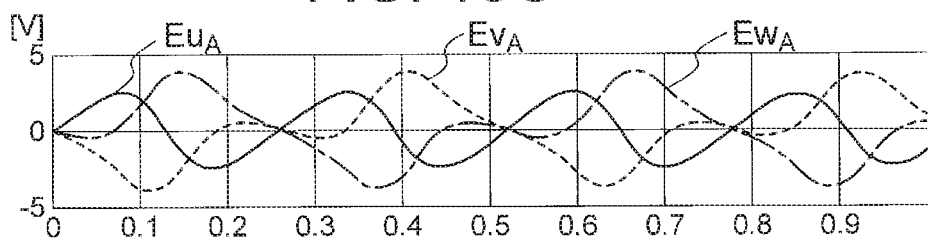
Figure 15D:
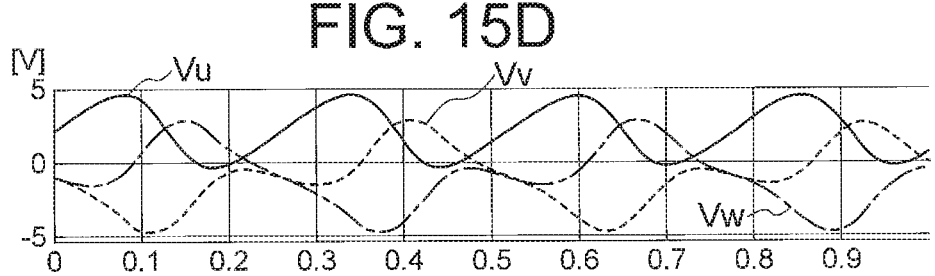
Figure 15E:
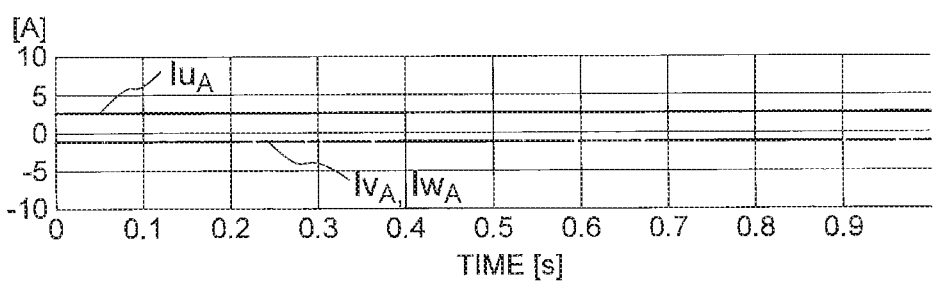

When the current controller 106 performs the current control to make the currents of the motor 7A equal to the command values, the output voltages Vu, Vv, and Vw of the U-phase, V-phase, and W-phase of the inverter 30 vary with variation in the induced voltages $Eu_A$, $Ev_A$, and $Ew_A$ of the U-phase, V-phase, and W-phase of the motor 7A, thereby adjusting the currents of the motor 7A. FIGS. 15A to 15E illustrate an example of the operation in this case. FIG. 15A illustrates the rotational speed of the motor 7A, FIG. 15B illustrates the phase of the motor 7A, FIG. 15C illustrates the U-phase induced voltage $Eu_A$, V-phase induced voltage $Ev_A$, and W-phase induced voltage $Ew_A$ of the motor 7A, FIG. 15D illustrates the U-phase output voltage Vu, V-phase output voltage Vv, and W-phase output voltage Vw of the inverter 30, and FIG. 15E illustrates the U-phase current $Iu_A$, V-phase current $Iv_A$, and W-phase current $Iw_A$ of the motor 7A.

Next, a case where direct-current excitation is performed on the two motors 7A and 7B by the single inverter 30 will be described with reference to FIGS. 16 to 23.

Figure 16:
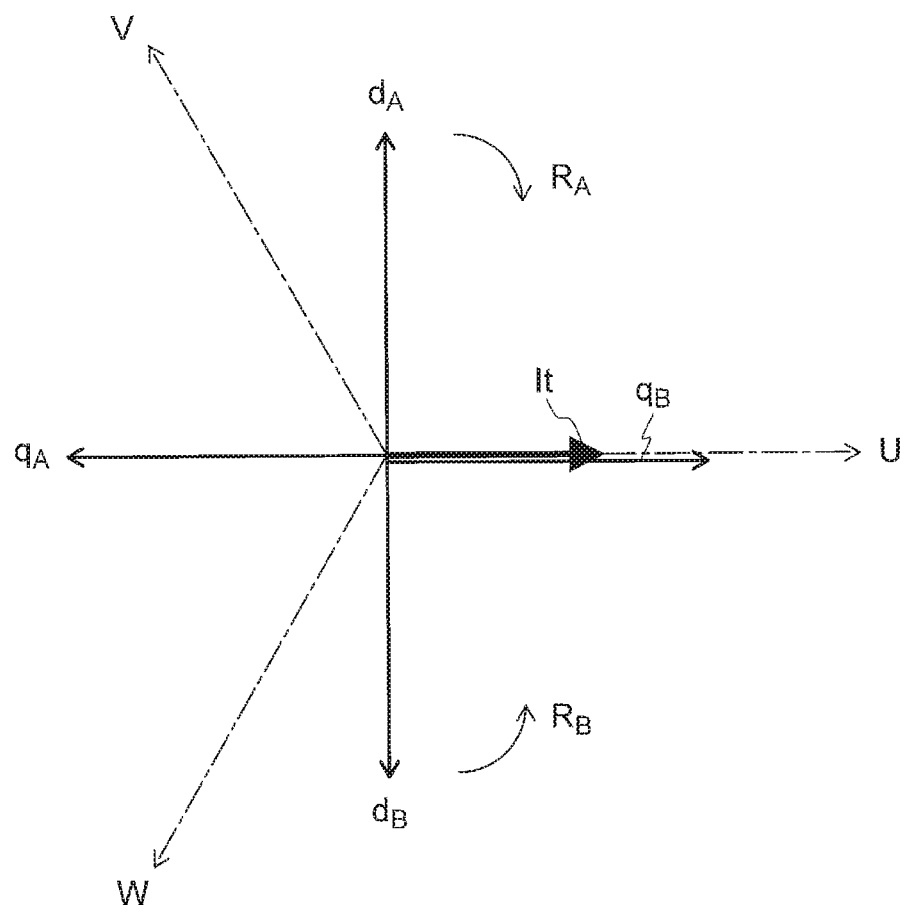
FIG. 16 is a vector diagram illustrating a resultant current output from the inverter and the directions of rotation of the first and second motors due to the resultant current when the target pull-in position is 0 degrees, the initial phase of the first motor is 90 degrees, and the initial phase of the second motor is −90 degrees.

In FIG. 16, $d_A$ indicates the d-axis of the motor 7A, and $q_A$ indicates the q-axis of the motor 7A; $d_B$ indicates the d-axis of the motor 7B, and $q_B$ indicates the q-axis of the motor 7B.

In the example illustrated in FIG. 16, it is assumed that the initial phase (the position of the d-axis $d_A$) of the motor 7A is 90 degrees ($\pi/2$ rad), and the initial phase (the position of the d-axis $d_B$) of the motor 7B is −90 degrees (−$\pi/2$ rad).

When the inverter 30 provides the three-phase output voltages to generate the current vector It in the U-phase direction as with FIG. 12, the d-axis $d_A$ of the first motor 7A and the d-axis $d_B$ of the second motor 7B are attracted to the 0-degree direction as indicated by arrows $R_A$ and RB, respectively.

Due to the difference in the initial phase, the magnitudes and directions of the induced voltages of the respective phases are different between the first motor 7A and the second motor 7B.

Figure 17A:
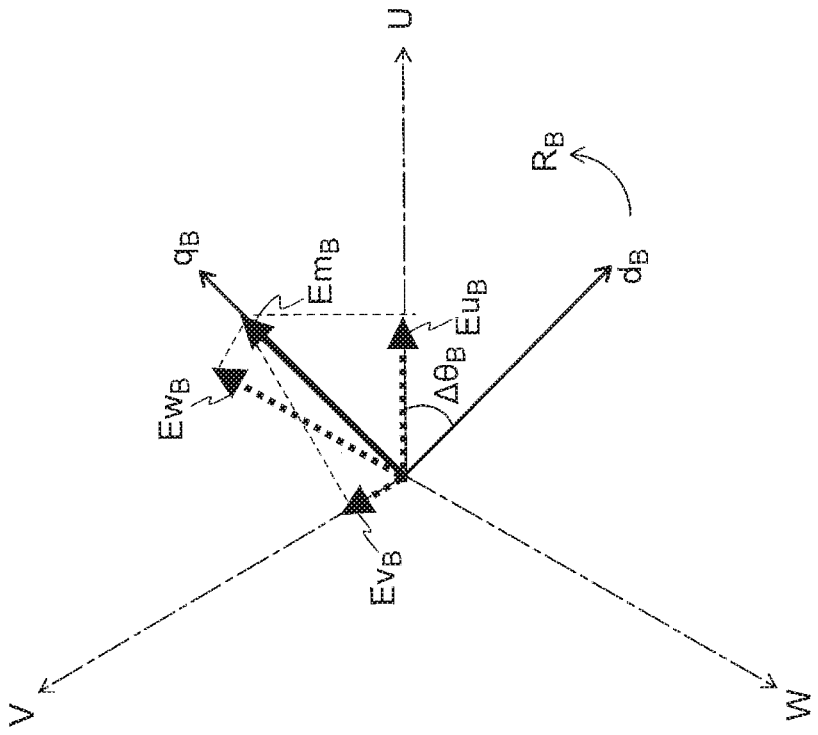
FIGS. 17A and 17B are vector diagrams illustrating the induced voltages due to rotation of the first motor and induced voltages due to rotation of the second motor.
Figure 17B:
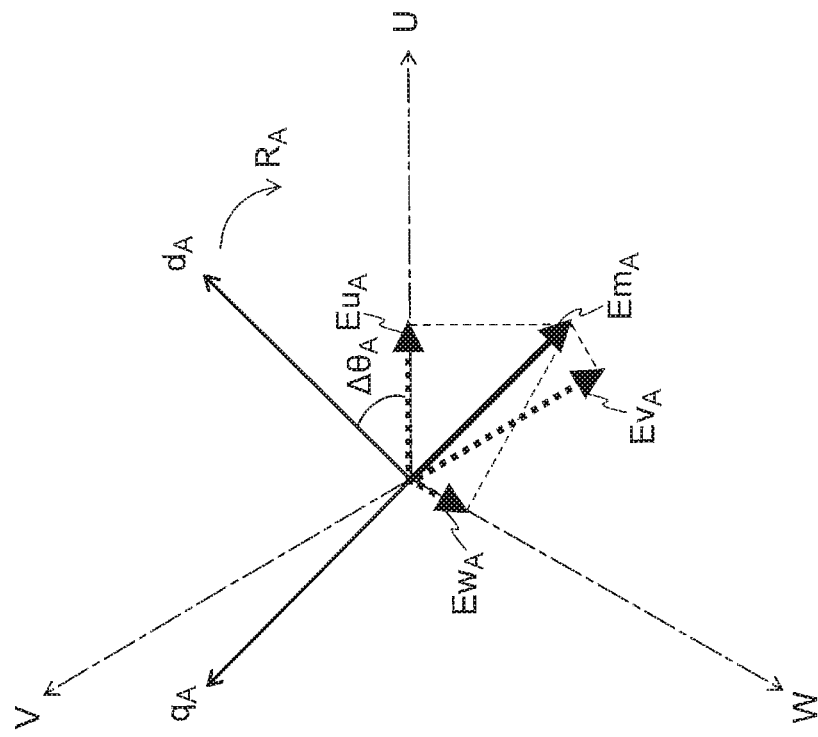

For example, as illustrated in FIGS. 17A and 17B, when the lead angle $\Delta\theta_A$ of the d-axis $d_A$ of the first motor 7A and the lead angle $\Delta\theta_B$ of the d-axis $d_B$ of the second motor 7B have a relation of $\Delta\theta_A=-\Delta\theta_B$ (when the lead angles are equal in absolute value and opposite in sign), the directions of $Eu_A$ and $Eu_B$ are the same, the directions of $Ev_A$ and $Ev_B$ are opposite to each other, and the directions of $Ew_A$ and $Ew_B$ are opposite to each other. Also, the magnitudes of $Eu_A$ and $Eu_B$ are equal, the magnitudes of $Ev_A$ and $Ew_B$ are equal, and the magnitudes of $Ew_A$ and $Ev_B$ are equal.

When the current control is performed only on the first motor 7A, the magnitudes of the output voltages Vu, Vv, and Vw of the U-phase, V-phase, and W-phase of the inverter 30 are made nearly equal to values (vector sums) obtained by adding the induced voltages $Eu_A$, $Ev_A$, and $Ew_A$ to the voltages (applied voltages at rest) V0u, V0v, and V0w illustrated in FIG. 12, in order to prevent the currents of the motor 7A from decreasing due to the induced voltages $Eu_A$, $Ev_A$, and $Ew_A$.

Figure 18:
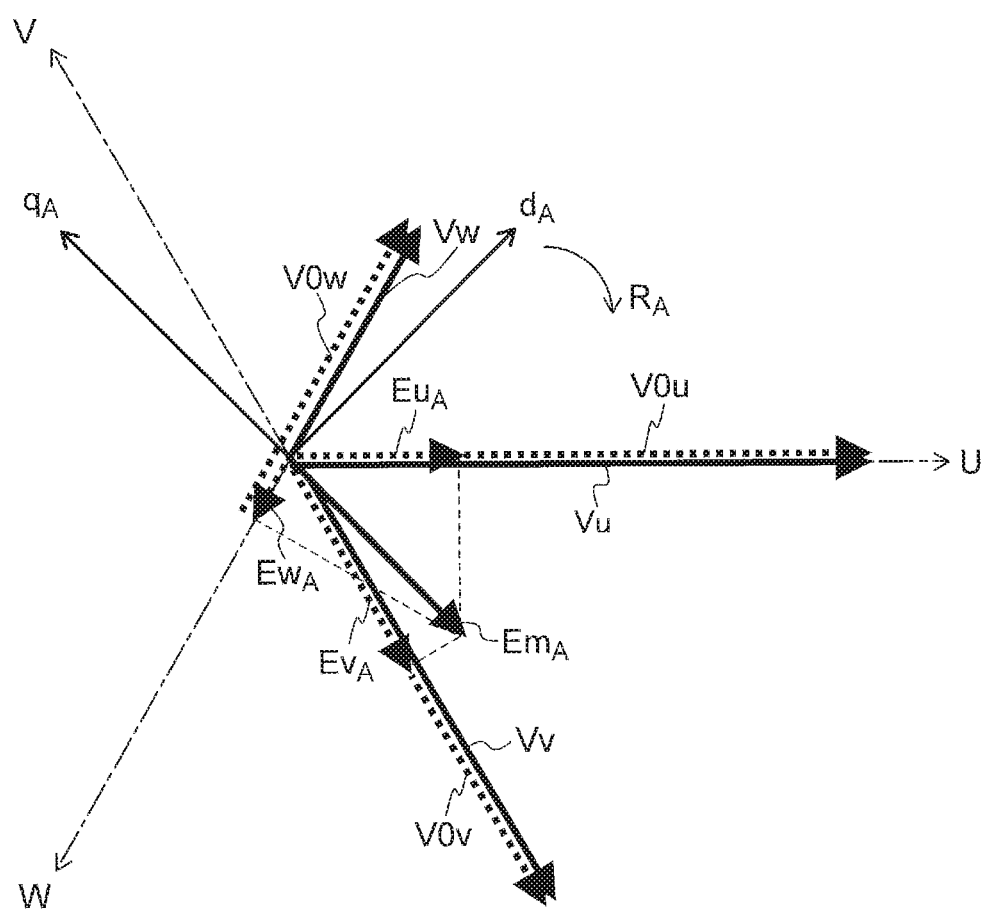
FIG. 18 is a vector diagram illustrating the inverter output voltages and the induced voltages of the first motor when current control is performed on the first motor.

When the two motors 7A and 7B are driven by the single inverter 30, the output voltages Vu, Vv, and Vw illustrated in FIG. 18 are applied also to the second motor 7B.

Figure 19:
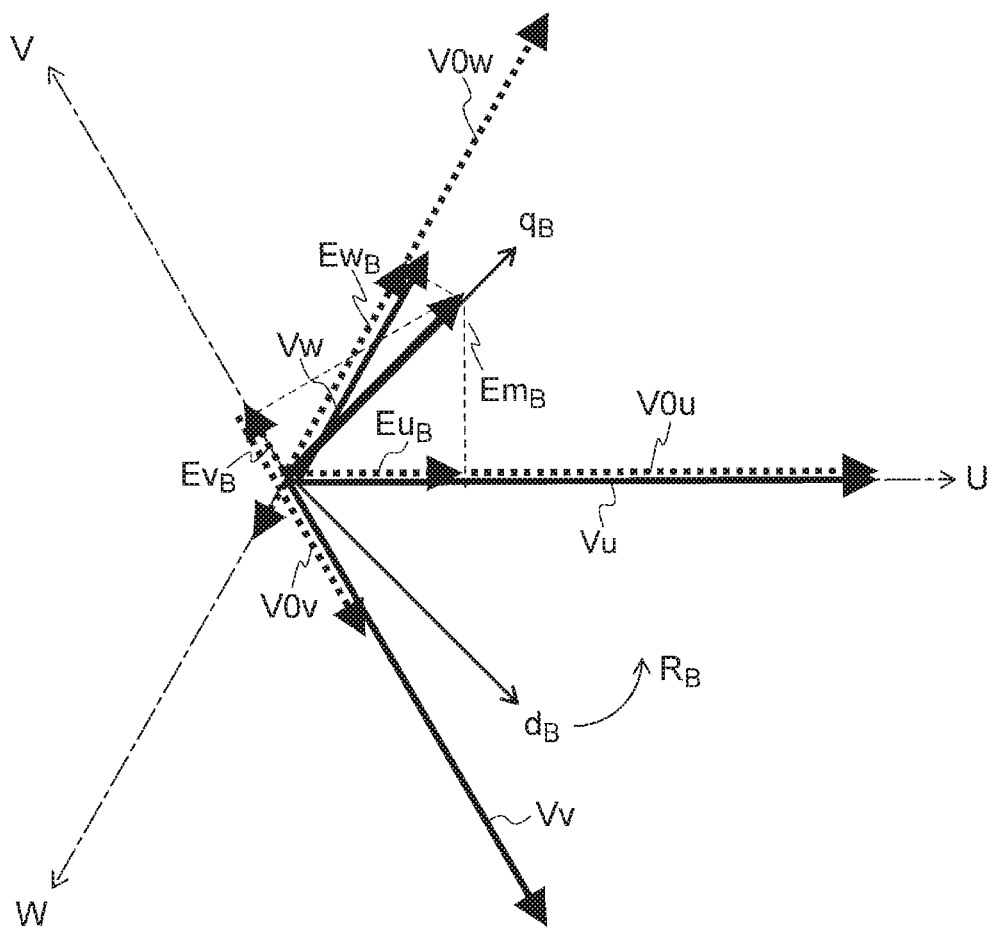
FIG. 19 is a vector diagram illustrating the inverter output voltages and the induced voltages of the second motor when current control is performed on the first motor.
Figure 20A:
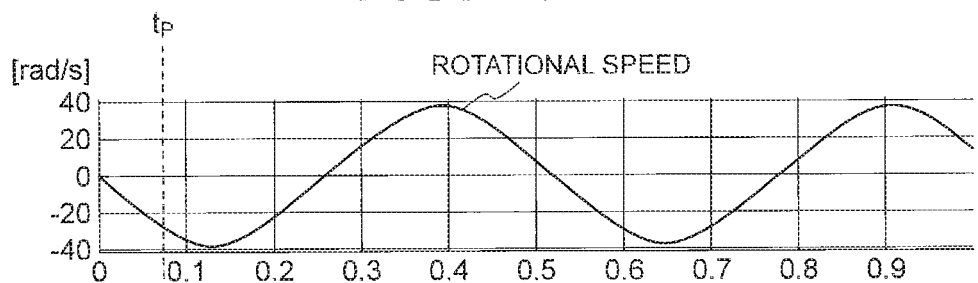
FIGS. 20A to 20E are waveform charts illustrating the operation of the first motor when inverter output voltages determined for current control on the first motor are applied.
Figure 20B:
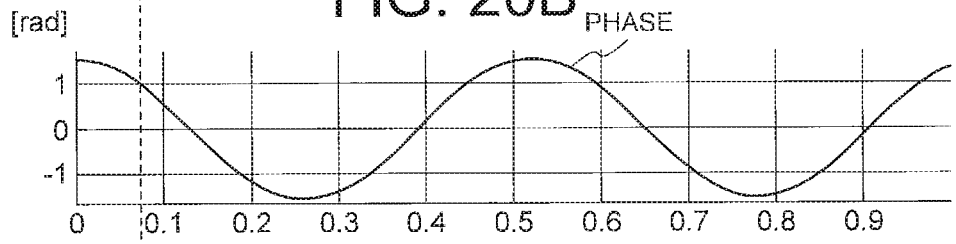
Figure 20C:
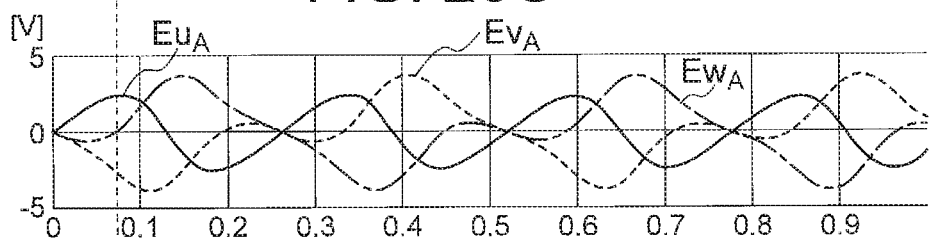
Figure 20D:
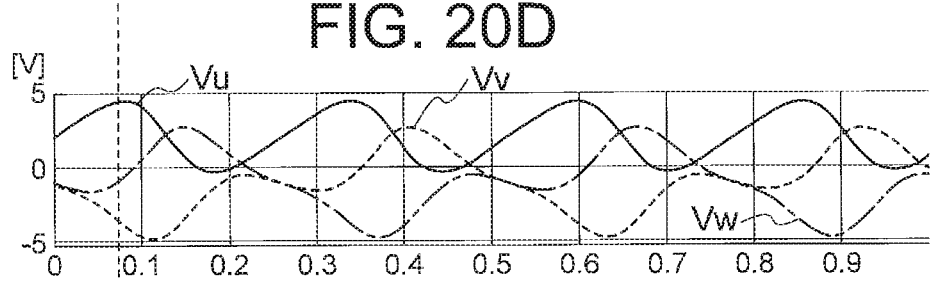
Figure 20E:
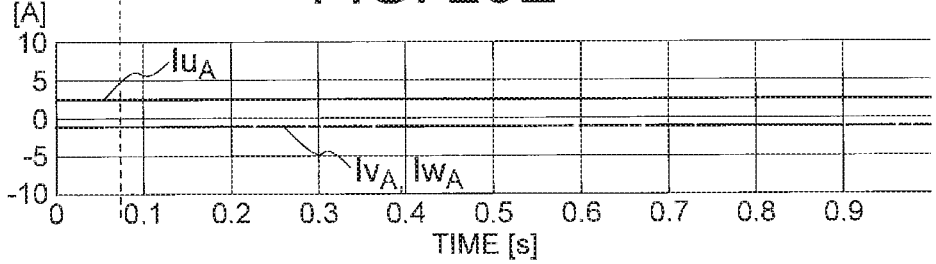
Figure 21A:
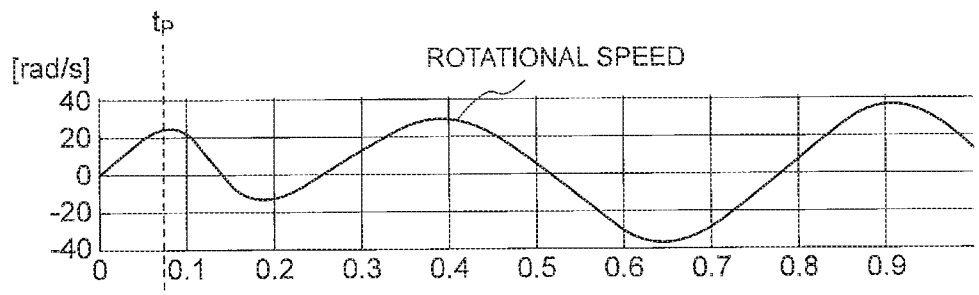
FIGS. 21A to 21E are waveform charts illustrating the operation of the second motor when the inverter output voltages determined for current control on the first motor are applied.
Figure 21B:
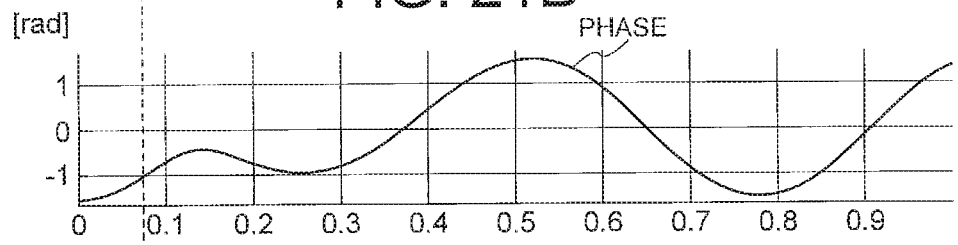
Figure 21C:
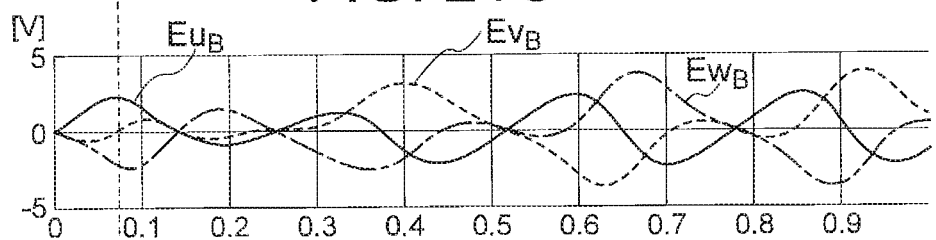
Figure 21D:
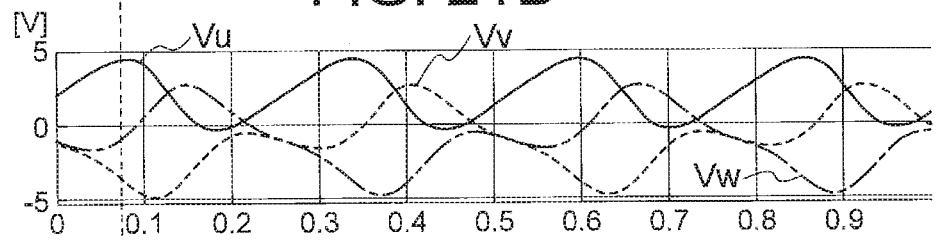
Figure 21E:
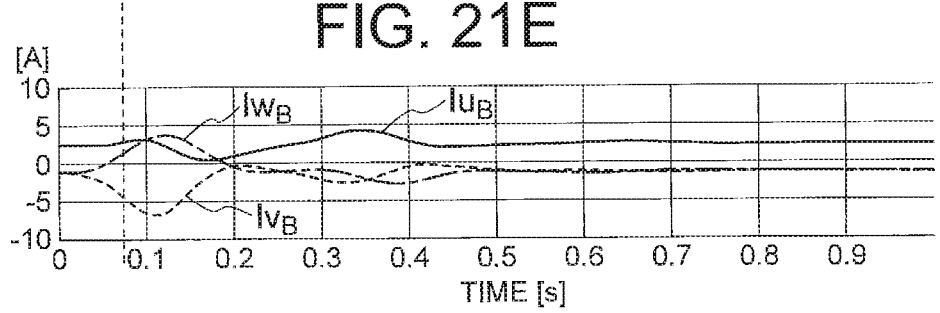

As a result, as illustrated in FIG. 19, of the output voltages Vu, Vv, and Vw of the inverter 30 applied to the second motor 7B, the U-phase output voltage Vu is generally appropriate (equal to V0u+$Eu_B$). However, the V-phase output voltage Vv is excessive in the negative direction (larger than V0v+$Ev_B$), and the W-phase output voltage Vw is insufficient in the negative direction (smaller than V0w+$Ew_B$).

Thus, the V-phase current $Iv_B$ tends to increase in the negative direction, and the W-phase current $Iw_B$ increases in the positive direction.

FIGS. 20A to 20E and FIGS. 21A to 21E illustrate an example of the operation. FIGS. 18 and 19 illustrate a state near time $t_p$ in FIGS. 20A to 20E and FIGS. 21A to 21E.

In the first embodiment, the current control is performed on one of the d-axis currents larger in absolute value than the other and one of the q-axis currents larger in absolute value than the other, as described above.

Figure 22:
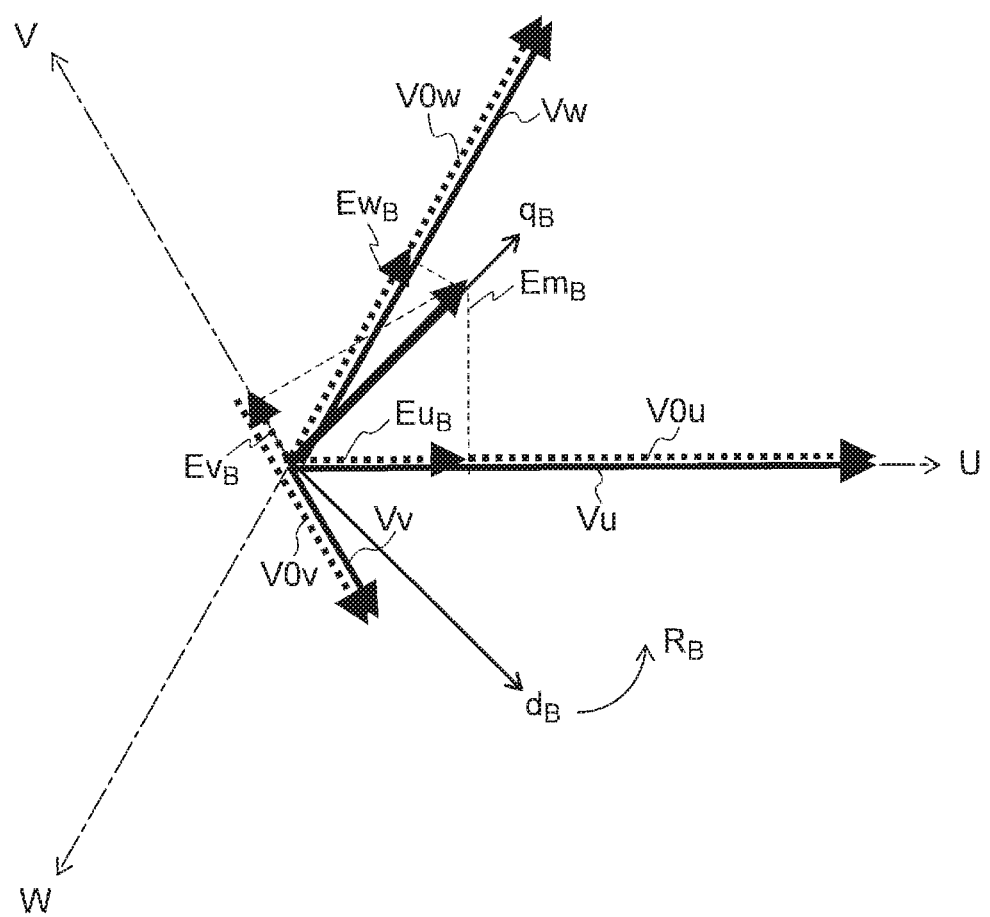
FIG. 22 is a vector diagram illustrating the induced voltages of the second motor and the inverter output voltages when current control is performed on the second motor.

When the current control is performed on the first motor 7A, the V-phase current $Iv_B$ of the second motor 7B increases in the negative direction and the W-phase current $Iw_B$ of the second motor 7B increases in the positive direction, and thus the absolute value of the d-axis current and the absolute value of the q-axis current of the second motor 7B both become larger than those of the first motor 7A. As described above, when the absolute value of the d-axis current and the absolute value of the q-axis current of the second motor 7B are larger, the current control is performed on the second motor 7B as illustrated in FIG. 22.

In this case, in order to cancel the induced voltages $Eu_B$, $Ev_B$, and $Ew_B$ of the respective phases of the second motor 7B illustrated in FIG. 17B, the output voltages Vu, Vv, and Vw of the inverter 30 are adjusted to values equal to the sums of the voltages (voltages at rest) V0u, V0v, and V0w illustrated in FIG. 12 and the induced voltages $Eu_B$, $Ev_B$, and $Ew_B$ of the second motor 7B.

Figure 23:
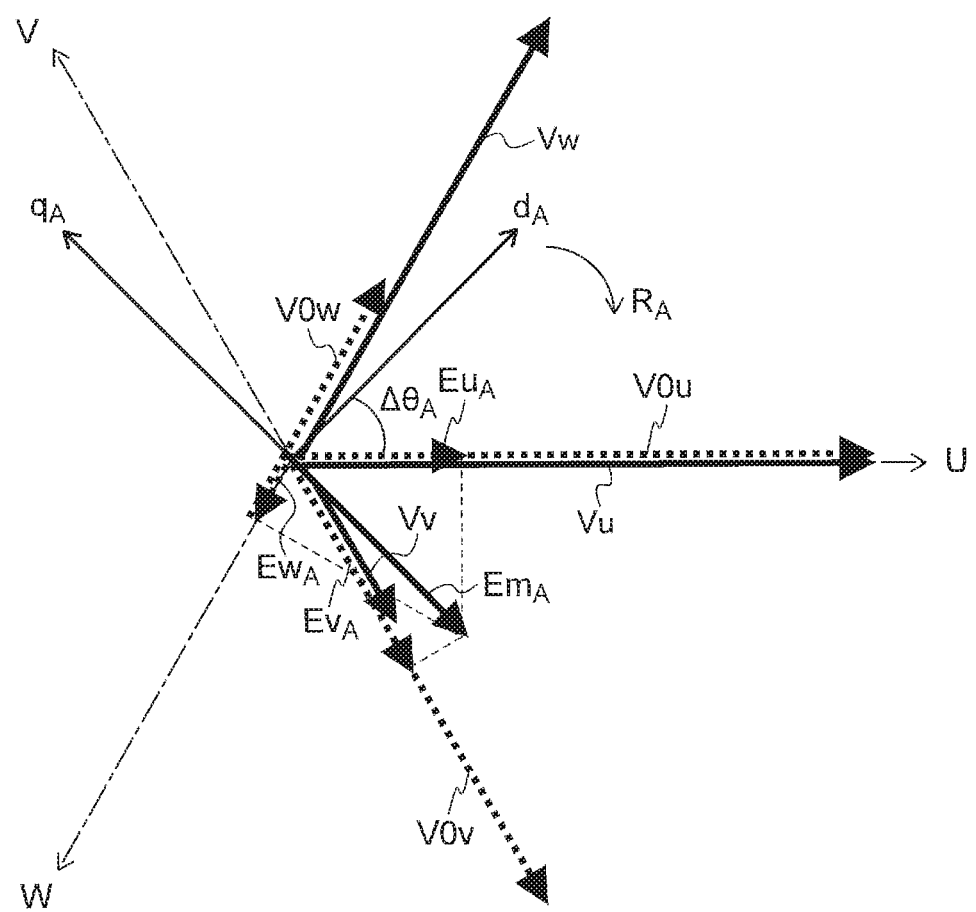
FIG. 23 is a vector diagram illustrating the induced voltages of the first motor and the inverter output voltages when current control is performed on the second motor.

When the current control is performed on the second motor 7B, output voltages applied to the first motor 7A are excessive or insufficient as illustrated in FIG. 23.

For example, while the U-phase output voltage Vu applied to the first motor 7A is generally appropriate (equal to V0u+$Eu_A$), the V-phase output voltage Vv is insufficient in the negative direction (smaller than V0v+$Ev_A$), and the W-phase output voltage Vw is excessive in the negative direction (larger than V0w+$Ew_A$).

Thus, the V-phase current $Iv_A$ tends to increase in the positive direction, and the W-phase current $Iw_A$ increases in the negative direction.

As a result, the absolute value of the d-axis current and the absolute value of the q-axis current of the first motor 7A both become larger than those of the second motor 7B. Thus, the current control is performed on the first motor 7A.

In this case, in order to cancel the induced voltages $Eu_A$, $Ev_A$, and $Ew_A$ of the respective phases of the first motor 7A illustrated in FIG. 17A, the output voltages Vu, Vv, and Vw of the inverter 30 are adjusted to values equal to the sums of the voltages (voltages at rest) V0u, V0v, and V0w illustrated in FIG. 12 and the induced voltages $Eu_A$, $Ev_A$, and $Ew_A$ of the first motor 7A.

As a result of performing the above control, the V-phase current $Iv_A$ of the first motor and the W-phase current $Iw_B$ of the second motor behave similarly, and the W-phase current $Iw_A$ of the first motor and the V-phase current $Iv_B$ of the second motor behave similarly. Thus, the difference between the V-phase current $Iv_A$ of the first motor 7A and the W-phase current $Iw_B$ of the second motor 7B is reduced, and the difference between the W-phase current $Iw_A$ of the first motor 7A and the V-phase current $Iv_B$ of the second motor 7B is reduced.

Although the above describes a case where the initial phases satisfy $\Delta\theta_A=-\Delta\theta_B$ and the pull-in phase θref_ini is at the position of the U-phase winding, the increase and decrease relation between the currents varies depending on the initial phases and the pull-in phase (target phase). In any case, it is possible to similarly obtain the advantage of reducing a current peak compared to the case of performing the current control only on one of the motors.

As above, in the example illustrated in FIG. 5, the q-axis current command value Iq* is fixed at zero, and the d-axis current command value Id* increases in a stepwise manner. Alternatively, it is possible that the d-axis current command value Id* is fixed at zero, and the q-axis current command value Iq* increases in a stepwise manner. In short, it is sufficient that a value fixed at zero be used as one of the d-axis current command value Id* and the q-axis current command value Iq*, and a value increasing in a stepwise manner be used as the other of the d-axis current command value Id* and the q-axis current command value Iq*.

Although the above describes a case where the number of motors is two, the number of motors driven in parallel may be three or more. In generalization, when N motors (N being an integer not less than 2) are driven in parallel, it is possible to perform dq conversion of the three-phase currents of each of the N motors to generate N d-axis currents and N q-axis currents, determine the absolute values of the N d-axis currents and the absolute values of the N q-axis currents, select one of the N d-axis currents that is the largest in absolute value of the N d-axis currents, perform control to make the selected d-axis current equal to a d-axis current command value, select one of the N q-axis currents that is the largest in absolute value of the N q-axis currents, and perform control to make the selected q-axis current equal to a q-axis current command value.

Figure 24:
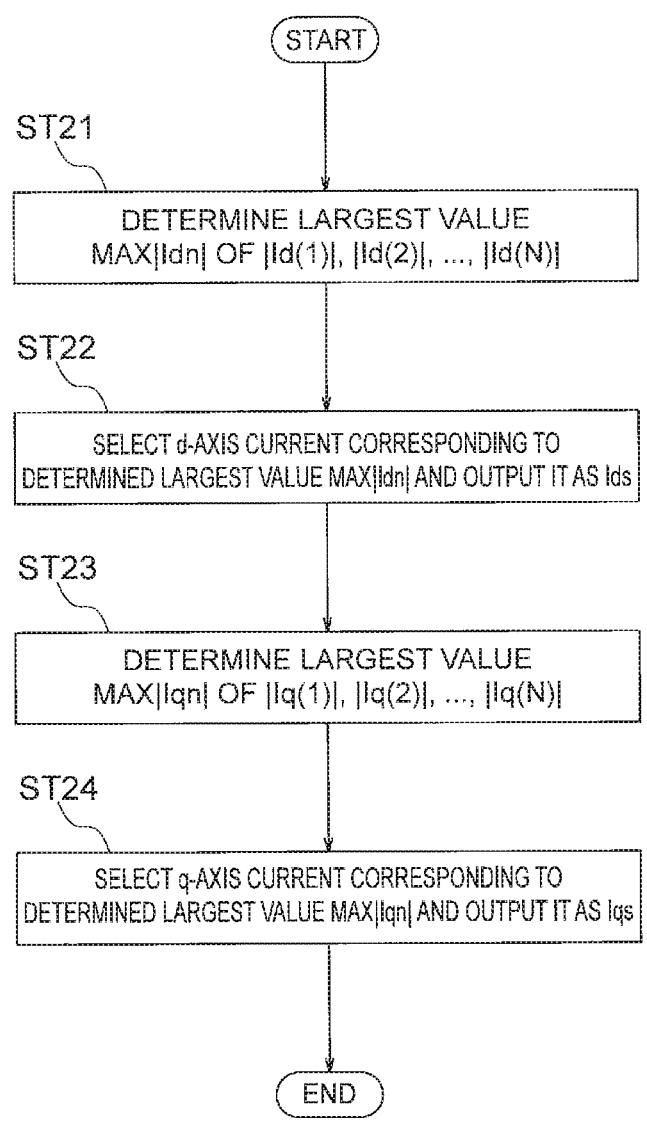
FIG. 24 is a flowchart illustrating a procedure of a process of current selection by a current selector similar to the current selector of FIG. 4 when three or more motors are driven by using a controller similar to the controller of FIG. 4 in a motor driving apparatus similar to the motor driving apparatus of FIG. 1.

A procedure of a process of the selection from the N d-axis currents and N q-axis currents in the first embodiment will be described below with reference to FIG. 24.

In step ST21, the largest value MAXId of the absolute values |Id(1)|, |Id(2)|, ..., |Id(N)| of the respective d-axis currents Id(1), Id(2), ..., Id(N) of the N motors is determined.

In step ST22, the d-axis current Id(n) (=MAXId) corresponding to the largest value MAXId determined in step ST21 is selected and output as a selected d-axis current Ids.

In step ST23, the largest value MAXIq of the absolute values |Iq(1)|, |Iq(2)|, ..., |Iq(N)| of the respective q-axis currents Iq(1), Iq(2), ..., Iq(N) of the N motors is determined.

In step ST24, the q-axis current Iq(n) (=MAXIq) corresponding to the largest value MAXIq determined in step ST23 is selected and output as a selected q-axis current Iqs.

Upon completion of step ST24, the process at the control period ends.

As above, with this embodiment, in an apparatus that drives multiple permanent magnet synchronous motors with a single inverter, it is possible to reduce a peak value of the motor currents occurring during pull-in of each magnetic pole position to a designated position, and reduce the possibilities of breakdown of the switching elements of the inverter, demagnetization of the motors, or the like due to overcurrent.

Second Embodiment

In the first embodiment, at least one of the d-axis current command value Id* and q-axis current command value Iq* increases in a stepwise manner. However, in a second embodiment, at least one of the d-axis current command value Id* and q-axis current command value Iq* increases gradually.

Figure 25:
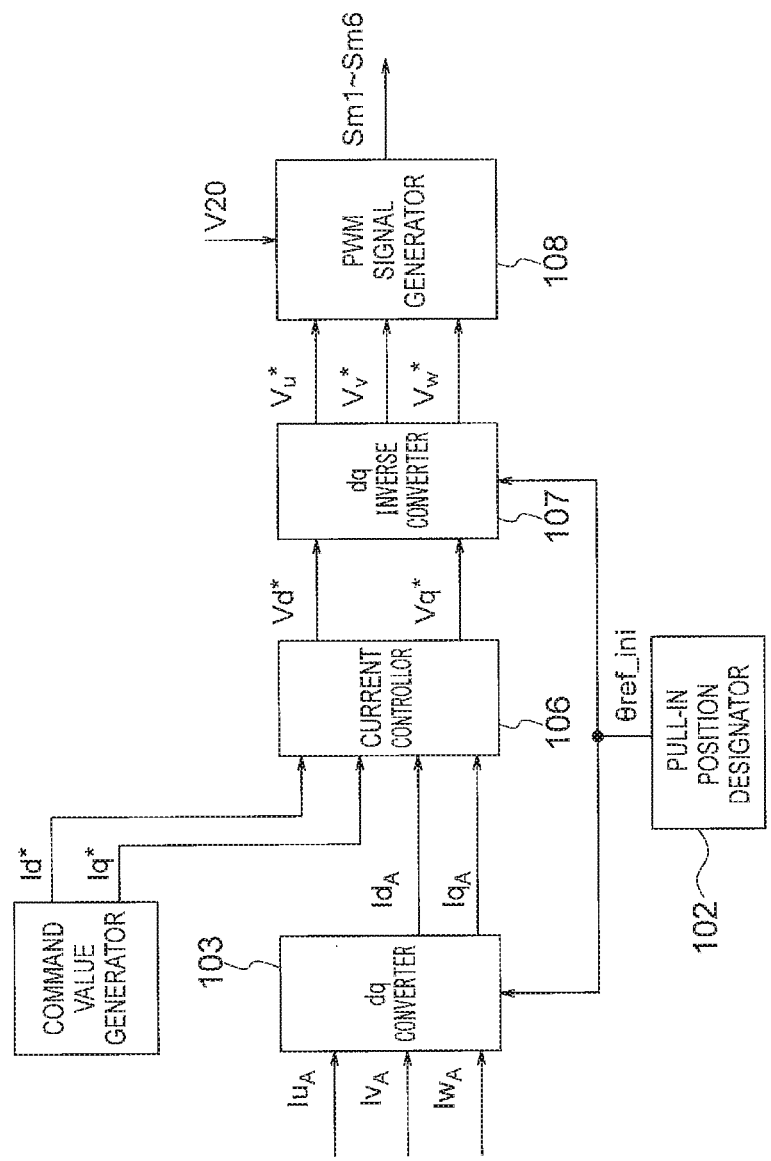
FIG. 25 is a block diagram illustrating a controller used in a second embodiment of the present invention.

FIG. 25 illustrates a controller used in the second embodiment.

The controller 100b of FIG. 25 is generally the same as the controller 100a of FIG. 7. However, a command value generator 101b is provided instead of the command value generator 101a.

Figure 26:
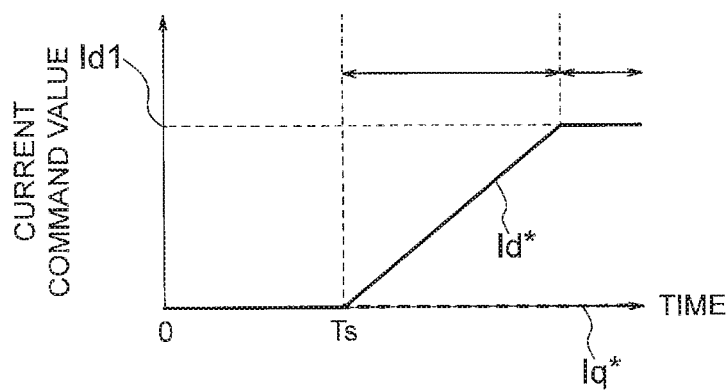
FIG. 26 is a chart illustrating an example of a d-axis current command value and a q-axis current command value generated by a command value generator of FIG. 25.

The command value generator 101b outputs, as the d-axis current command value Id* and q-axis current command value Iq*, ones illustrated in FIG. 26. In the example illustrated in FIG. 26, the q-axis current command value Iq* is fixed at zero, and the d-axis current command value Id* begins to increase from zero at the time Ts of the start of the pull-in and gradually, e.g., linearly, increases to a predetermined value Id1.

FIGS. 27A to 27H illustrate an example of the behavior of the motor currents and the behavior of the motor magnetic pole positions in a case where the initial magnetic pole position of the motor 7A is −90 degrees, the initial magnetic pole position of the motor 7B is +90 degrees, and they are pulled in from the above state to 0 degrees, in the second embodiment, and FIGS. 28A to 28F illustrate the behavior of the d-axis currents and the q-axis currents corresponding to the above motor currents.

In FIGS. 26, 27A to 27H, and 28A to 28F, Ta indicates a period during which the direct-current excitation is performed, and Tb indicates a rotation period following the direct-current excitation.

Figure 28A:
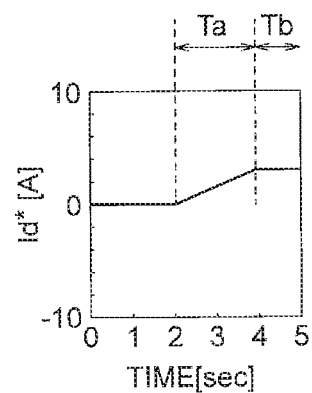
FIGS. 28A to 28F are charts illustrating an example of the behavior of d-axis currents and q-axis currents corresponding to the motor currents in the case of using the controller of FIG. 25, together with a d-axis current command value and a q-axis current command value.
Figure 28D:
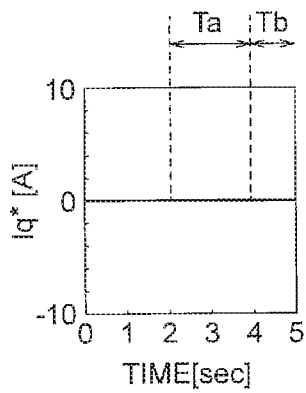
Figure 28B:
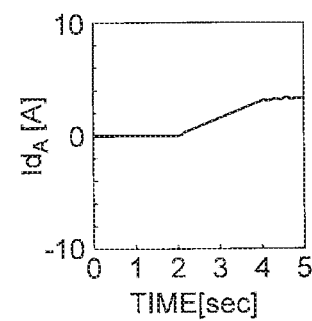
Figure 28E:
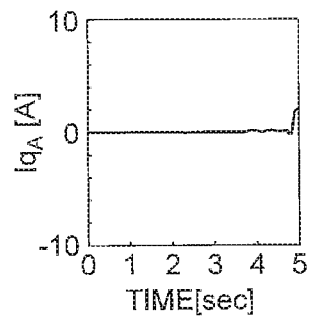
Figure 28C:
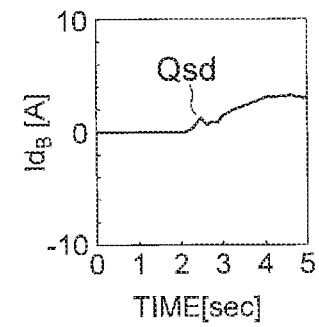
Figure 28F:
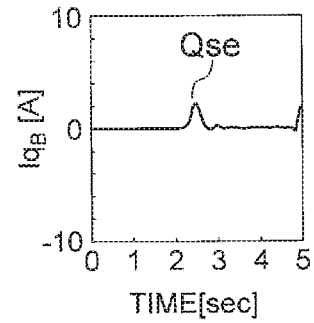

FIGS. 28A and 28D illustrate the d-axis current command value Id* and q-axis current command value Iq*, which are the same as those illustrated in FIG. 26.

Figure 27A:
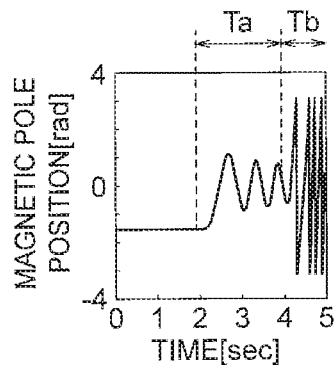
FIGS. 27A to 27H are charts illustrating an example of the behavior of motor currents and the behavior of motor magnetic pole positions in the case of using the controller of FIG. 25.
Figure 27E:
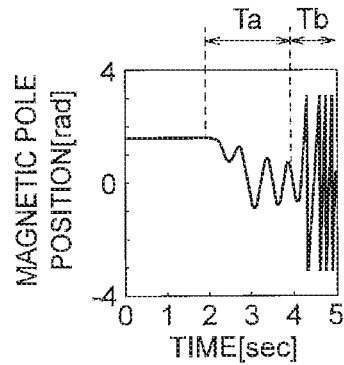
Figure 27B:
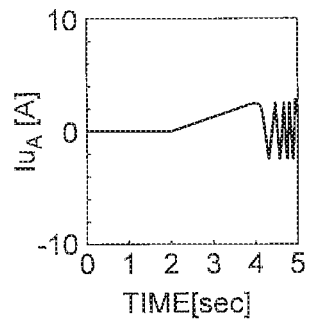
Figure 27F:
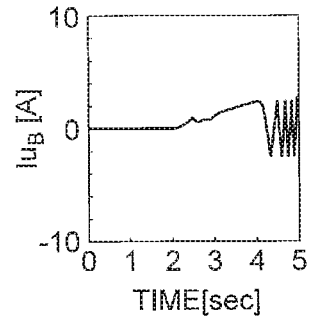
Figure 27C:
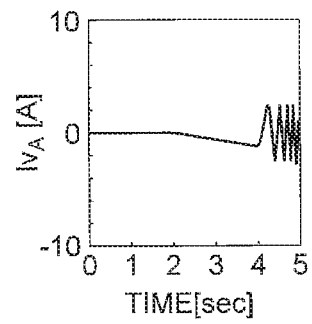
Figure 27G:
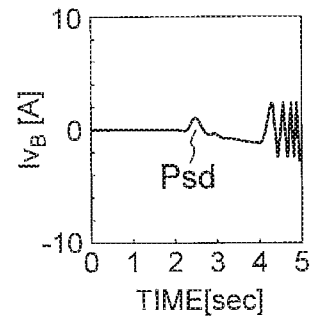
Figure 27D:
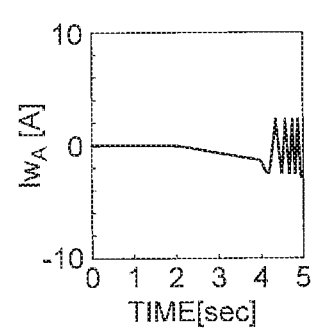
Figure 27H:
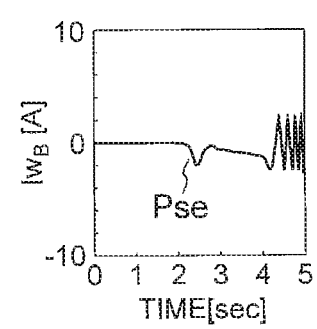

As illustrated in FIGS. 27A and 27E, the effect of reducing vibration of the motor magnetic pole positions is smaller than that in the first embodiment (FIGS. 8A and 8E).

On the other hand, as illustrated in FIGS. 27B to 27D and 27F to 27H, peak values of surge of the motor currents are about +1 A and −2 A (Psd in FIG. 27G and Pse in FIG. 27H), and a peak (Qsd in FIG. 28C) of the d-axis current $Id_B$ and a peak (Qse in FIG. 28F) of the q-axis current $Iq_B$ that correspond to these are also small.

As such, compared to the first embodiment (FIGS. 8B to 8D and 8F to 8H), it is possible to further reduce peak values of the motor currents. Thus, when it is desired to reduce peak values of the motor currents, the present configuration is more preferable.

As above, in the example illustrated in FIG. 26, the q-axis current command value Iq* is fixed at zero, and the d-axis current command value Id* increases gradually. Alternatively, it is possible that the d-axis current command value Id* is fixed at zero, and the q-axis current command value Iq* increases gradually. In short, it is sufficient that a value fixed at zero be used as one of the d-axis current command value Id* and q-axis current command value Iq*, and a value increasing gradually, e.g., linearly, be used as the other of the d-axis current command value Id* and q-axis current command value Iq*.

Third Embodiment

In the second embodiment, control is performed so that the d-axis current and q-axis current corresponding to the three-phase currents of a predetermined one of the motors 7A and 7B are made equal to respective corresponding command values.

However, in a third embodiment, control is performed so that one of the d-axis currents corresponding to the three-phase currents of the motors 7A and 7B that is larger in absolute value than the other is made equal to a d-axis current command value, and control is performed so that one of the q-axis currents corresponding to the three-phase currents of the motors 7A and 7B that is larger in absolute value than the other is made equal to a q-axis current command value, as with the first embodiment. The third embodiment is the same as the second embodiment in that at least one of the current command values increases gradually.

Figure 29:
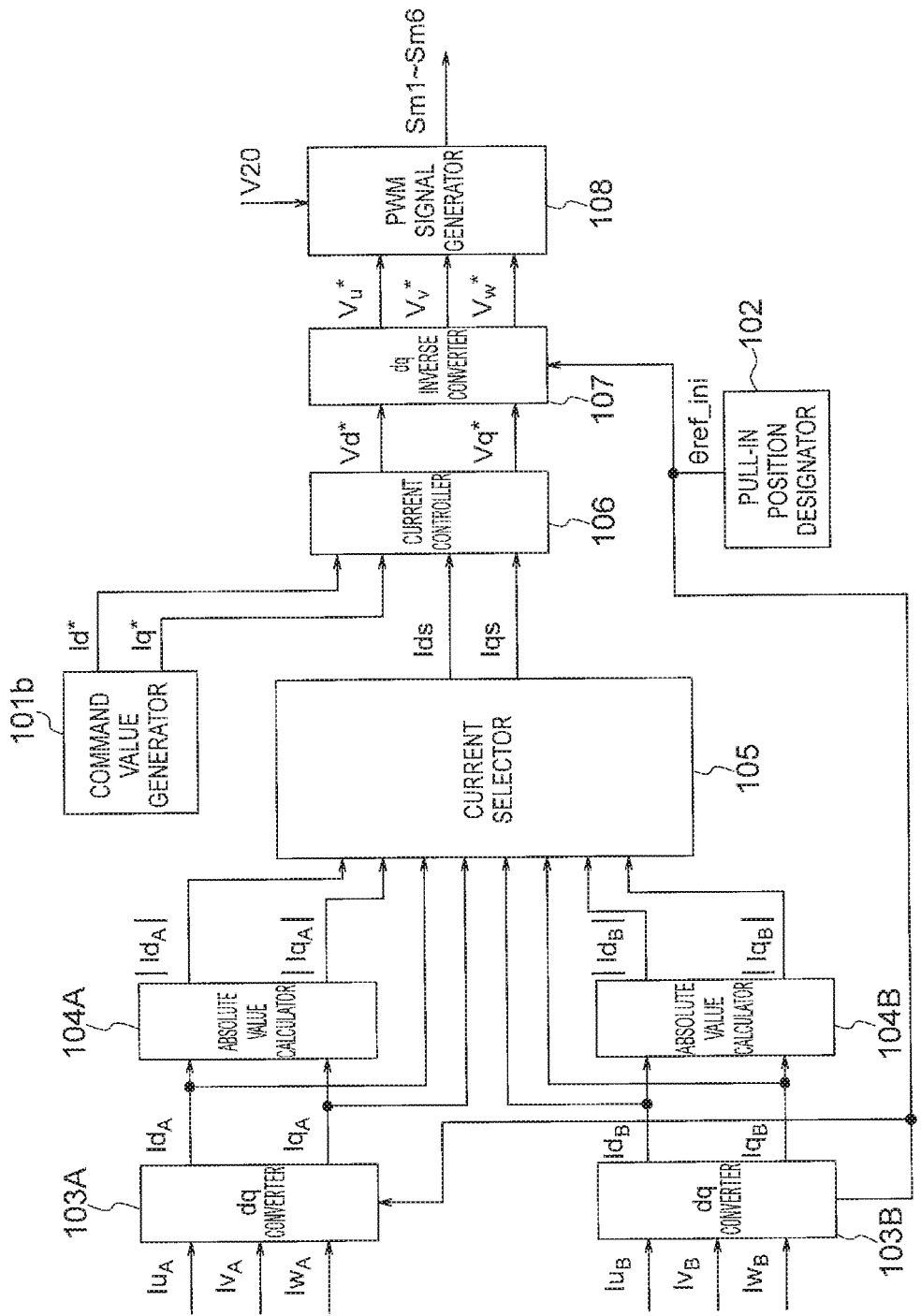
FIG. 29 is a block diagram illustrating a controller used in a third embodiment of the present invention.
Figure 30A:
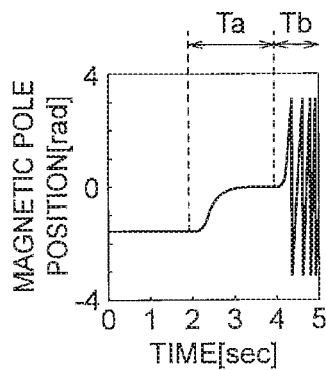
FIGS. 30A to 30H are charts illustrating an example of the behavior of motor currents and the behavior of motor magnetic pole positions in the case of using the controller of FIG. 29.
Figure 30E:
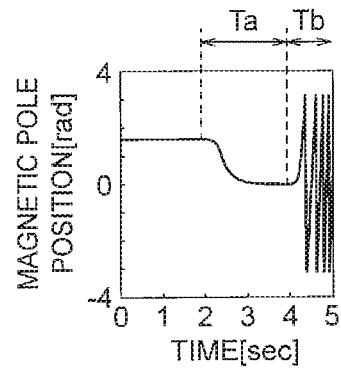
Figure 30B:
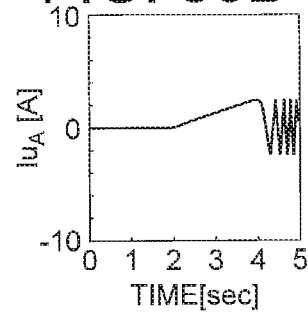
Figure 30F:
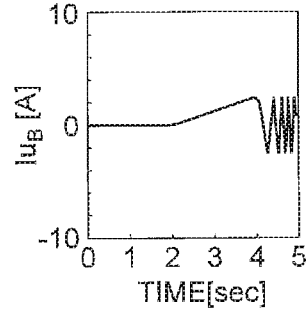
Figure 30C:
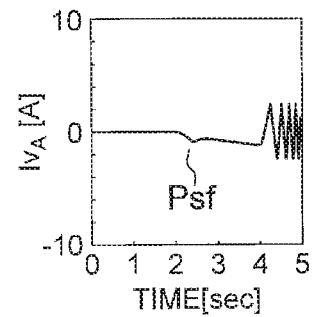
Figure 30G:
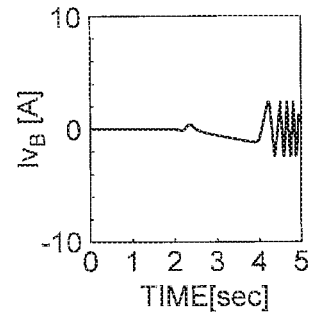
Figure 30D:
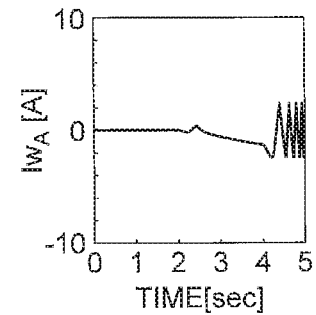
Figure 30H:
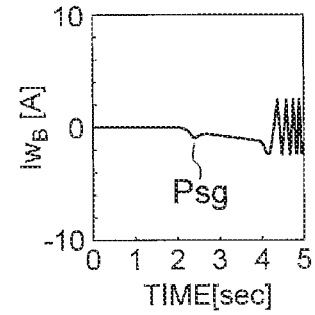

FIG. 29 illustrates a controller 100c used in the third embodiment.

The controller 100c of FIG. 29 is generally the same as the controller 100 of FIG. 4. However, a command value generator 101b is provided instead of the command value generator 101.

The command value generator 101b is the same as command value generator 101b used in the second embodiment, and outputs, as the d-axis current command value Id* and q-axis current command value Iq*, ones illustrated in FIG. 26.

FIGS. 30A to 30H illustrate an example of the behavior of the motor currents and the behavior of the motor magnetic pole positions in a case where the initial magnetic pole position of the motor 7A is −90 degrees, the initial magnetic pole position of the motor 7B is +90 degrees, and they are pulled in from the above state to 0 degrees, in the third embodiment, and FIGS. 31A to 31F illustrate the behavior of the d-axis currents and the q-axis currents corresponding to the above motor currents.

In FIGS. 30A to 30H and 31A to 31F, Ta indicates a period during which the direct-current excitation is performed, and Tb indicates a rotation period following the direct-current excitation.

Figure 31A:
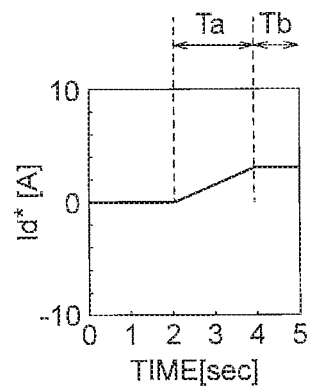
FIGS. 31A to 31F are charts illustrating an example of the behavior of d-axis currents and q-axis currents corresponding to the motor currents in the case of using the controller of FIG. 29, together with a d-axis current command value and a q-axis current command value.
Figure 31D:
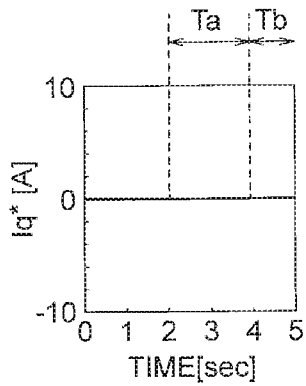
Figure 31B:
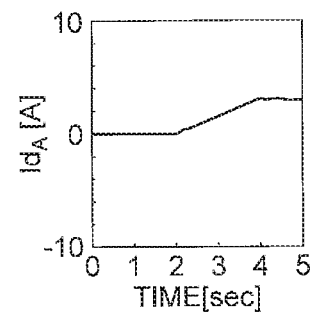
Figure 31E:
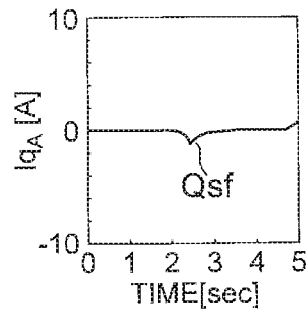
Figure 31C:
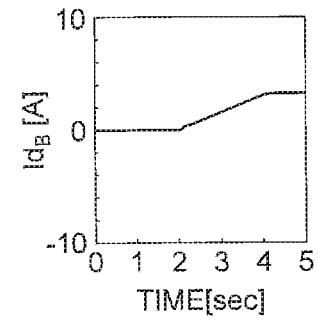
Figure 31F:
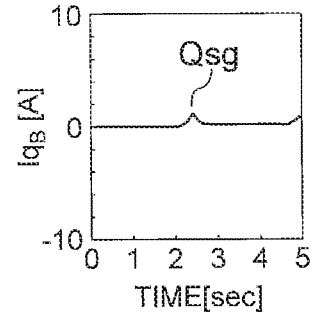

FIGS. 31A and 31D illustrate the d-axis current command value Id* and q-axis current command value Iq*, which are the same as those illustrated in FIG. 26.

As illustrated in FIGS. 30B to 30D and 30F to 30H, peak values of surge of the motor currents are about −1 A (Psf in FIG. 30C and Psg in FIG. 30H), and a peak (Qsf in FIG. 31E) of the q-axis current $Iq_A$ and a peak (Qsg in FIG. 31F) of the q-axis current $Iq_B$ that correspond to these are also small.

Also, the motor magnetic pole positions can be stably pulled in to 0 degrees. Although the control configuration is a little more complicated than that of FIG. 4, it is possible to further reduce peak values of the motor currents compared to the first embodiment. Thus, when it is desired to reduce peak values of the motor currents, the present configuration is more preferable.

As described in the second embodiment, instead of the configuration in which the q-axis current command value Iq* is fixed at zero, and the d-axis current command value Id* increases gradually, it is possible to employ a configuration in which the d-axis current command value Id* is fixed at zero, and the q-axis current command value Iq* increases gradually. In short, it is sufficient that a value fixed at zero be used as one of the d-axis current command value Id* and q-axis current command value Iq*, and a value increasing gradually, e.g., linearly, be used as the other of the d-axis current command value Id* and q-axis current command value Iq*.

Fourth Embodiment

In the first and third embodiments, from beginning to end of the direct-current excitation, for each of the d-axis current and q-axis current, one of the currents that is larger in absolute value is selected, and control is performed so that the selected current is made equal to a command value. By selecting one of the currents that is larger in absolute value and performing control to make the selected current equal to the command value, it is possible to make the larger of the value of a DC current flowing through the motor 7A and the value of a DC current flowing through the motor 7B closer to the smaller of the values.

In a fourth embodiment, for each of the d-axis current and q-axis current, until the current exceeds a command value therefor, one of the currents that is smaller in absolute value than the other is selected, and control is performed. By selecting one of the currents that is smaller in absolute value and performing control, it is possible to make the smaller of the value of a DC current flowing through the motor 7A and the value of a DC current flowing through the motor 7B closer to the larger of the values.

Here, for each of the d-axis current and q-axis current, "exceeding" the command value therefor means becoming larger in absolute value while having the same sign. Specifically, when the command value is positive, it means that the current is positive and its absolute value becomes larger than the absolute value of the command value, and when the command value is negative, it means that the current is negative and its absolute value becomes larger than the absolute value of the command value.

Figure 32:
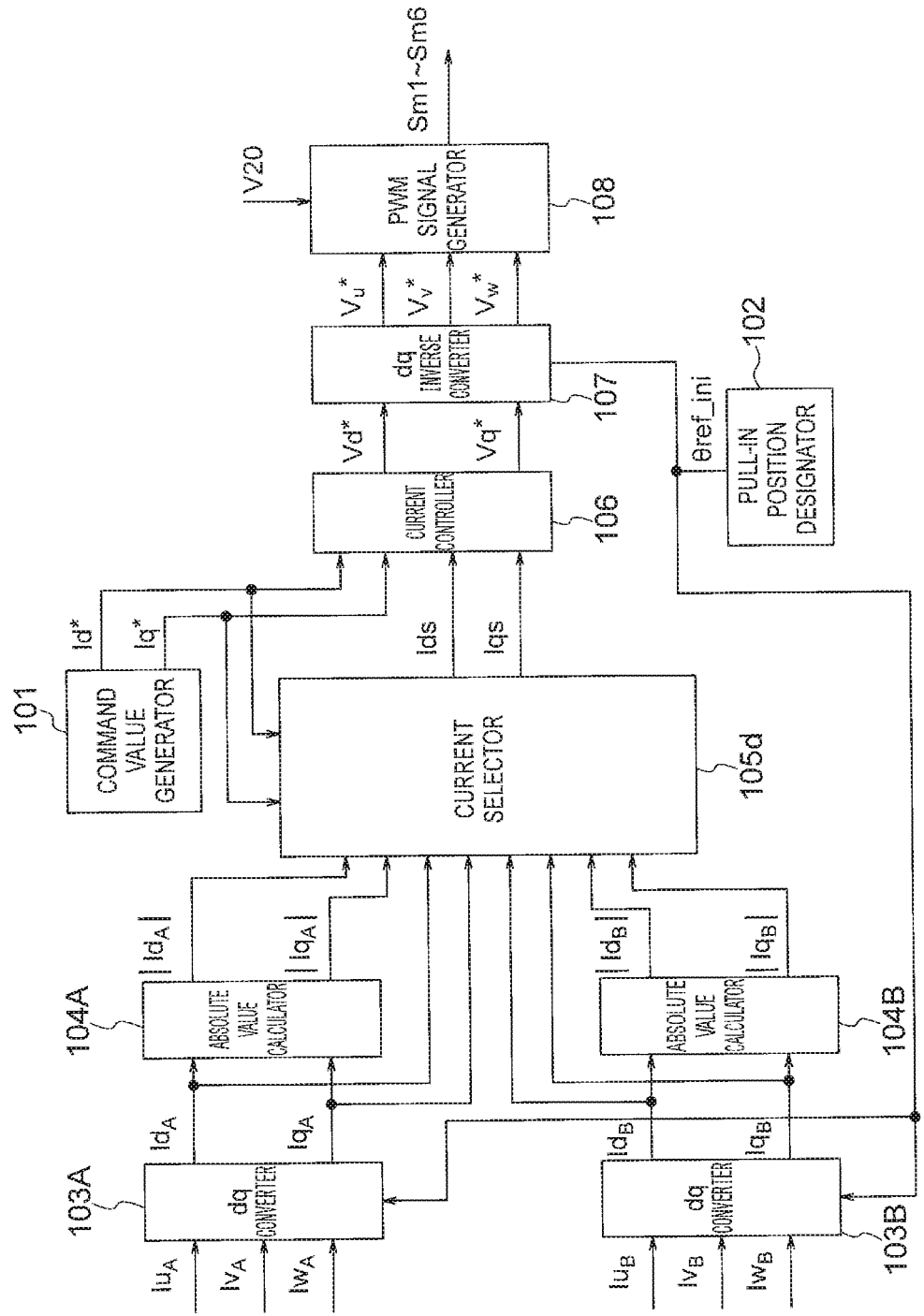
FIG. 32 is a block diagram illustrating a controller used in a fourth embodiment of the present invention.

FIG. 32 illustrates a controller used in the fourth embodiment.

The controller 100d illustrated in FIG. 32 is generally the same as the controller 100 of the first embodiment. However, a current selector 105d is provided instead of the current selector 105.

The current selector 105d of the fourth embodiment receives not only the d-axis currents $Id_A$ and $Id_B$, the q-axis currents $Iq_A$ and $Iq_B$, the absolute values $|Id_A|$ and $|Id_B|$ of the d-axis currents, and the absolute values $|Iq_A|$ and $|Iq_B|$ of the q-axis currents, but also the d-axis current command value Id* and q-axis current command value Iq*, and until any of the d-axis currents $Id_A$ and $Id_B$ exceeds the d-axis current command value Id*, selects and outputs one of them that is smaller in absolute value than the other of them, and after any of the d-axis currents $Id_A$ and $Id_B$ exceeds the d-axis current command value Id*, selects and outputs one of them that is larger in absolute value than the other of them, and similarly, until any of the q-axis currents $Iq_A$ and $Iq_B$ exceeds the q-axis current command value Iq*, selects and outputs one of them that is smaller in absolute value than the other of them, and after any of the q-axis currents $Iq_A$ and $Iq_B$ exceeds the q-axis current command value Iq*, selects and outputs one of them that is larger in absolute value than the other of them.

Specifically, until any of the d-axis currents $Id_A$ and $Id_B$ exceeds the d-axis current command value Id*, the current selector 105d selects the d-axis current corresponding to the smaller of the absolute values $|Id_A|$ and $|Id_B|$, and after any of the d-axis currents $Id_A$ and $Id_B$ exceeds the d-axis current command value Id*, the current selector 105d selects the d-axis current corresponding to the larger of the absolute values $|Id_A|$ and $|Id_B|$.

Also, until any of the q-axis currents $Iq_A$ and $Iq_B$ exceeds the q-axis current command value Iq*, the current selector 105d selects the q-axis current corresponding to the smaller of the absolute values $|Iq_A|$ and $|Iq_B|$, and after any of the q-axis currents $Iq_A$ and $Iq_B$ exceeds the q-axis current command value Iq*, the current selector 105d selects the q-axis current corresponding to the larger of the absolute values $Iq_A$ and $|Iq_B|$.

The selection of the currents by the current selector 105d is performed every control period, as with the first embodiment.

Although the above describes a case where the number of motors is two, the number of motors driven in parallel may be three or more. In generalization, when n motors (n being an integer not less than 2) are driven in parallel, it is possible to perform dq conversion of the three-phase currents of each of the N motors to generate N d-axis currents and N q-axis currents, determine the absolute values of the N d-axis currents and the absolute values of the N q-axis currents, select one of the N d-axis currents that is the smallest in absolute value of the N d-axis currents and perform control to make the selected d-axis current equal to a d-axis current command value until any of the N d-axis currents exceeds the d-axis current command value, select one of the N d-axis currents that is the largest in absolute value of the N d-axis currents and perform control to make the selected d-axis current equal to the d-axis current command value after any of the N d-axis currents exceeds the d-axis current command value, select one of the N q-axis currents that is the smallest in absolute value of the N q-axis currents and perform control to make the selected q-axis current equal to a q-axis current command value until any of the N q-axis currents exceeds the q-axis current command value, and select one of the N q-axis currents that is the largest in absolute value of the N q-axis currents and perform control to make the selected q-axis current equal to the q-axis current command value after any of the N q-axis currents exceeds the q-axis current command value.

Figure 33:
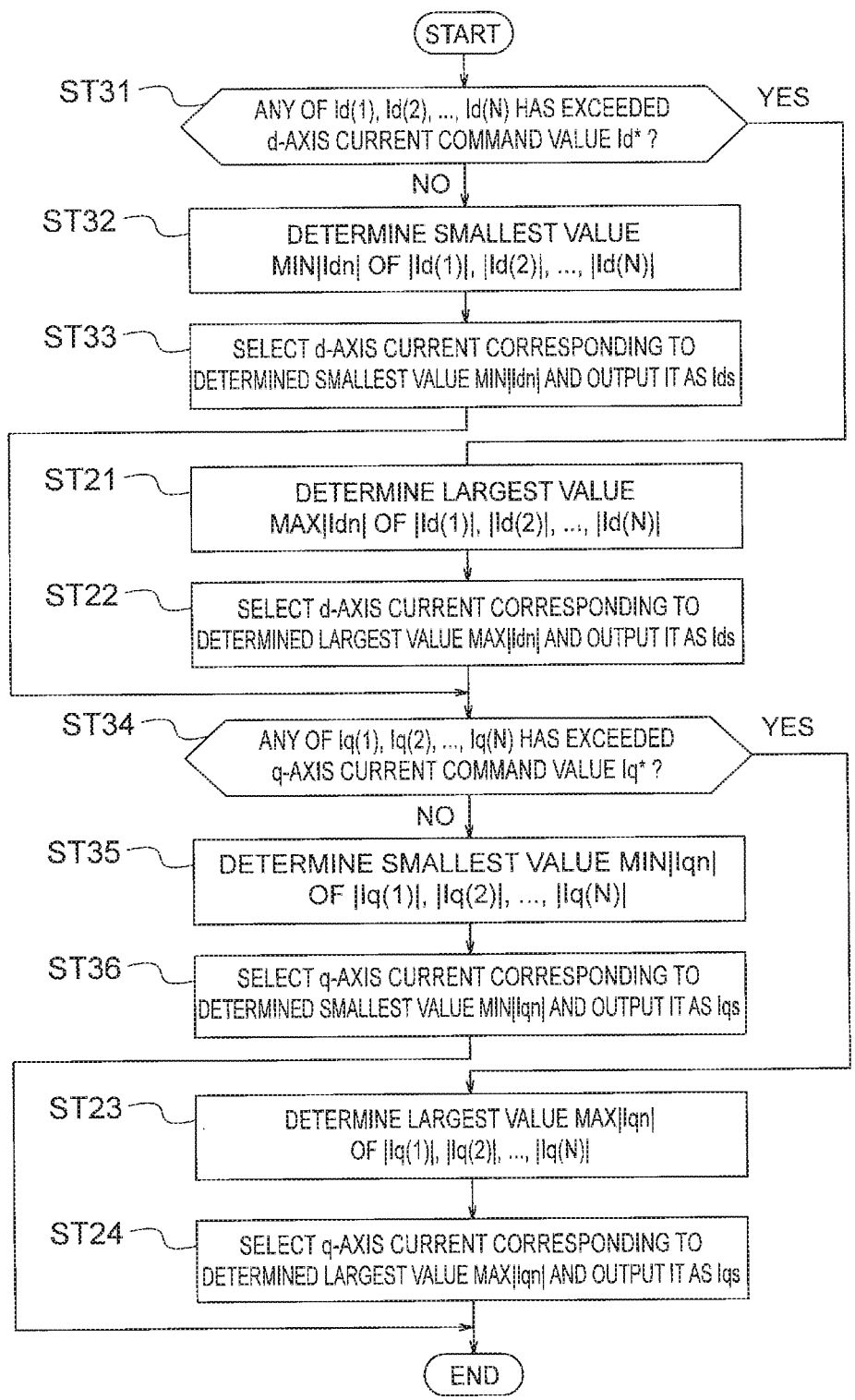
FIG. 33 is a flowchart illustrating a procedure of a process of current selection by a current selector similar to a current selector of FIG. 32 when three or more motors are driven by using a controller similar to the controller of FIG. 32 in a motor driving apparatus similar to the motor driving apparatus of FIG. 1.

A procedure of a process of the selection from the N d-axis currents Id and N q-axis currents Iq in the fourth embodiment will be described below with reference to FIG. 33. In FIG. 33, steps ST21 to ST24 are the same as those in FIG. 24.

In step ST31, a determination is made as to whether any of the d-axis currents Id(1), Id(2), ..., Id(N) of the N motors has exceeded the d-axis current command value Id* (has become larger than the d-axis current command value Id* for the first time since the start of the direct-current excitation).

If NO (if none of Id(1), Id(2), ..., Id(N) has exceeded the d-axis current command value Id*), the process proceeds to step ST32, and if YES, the processing of steps ST21 and ST22 is performed.

In step ST32, the smallest value MINId of the absolute values |Id(1)|, |Id(2)|, ..., |Id(N)| of the respective d-axis currents Id(1), Id(2), ..., Id(N) is determined.

In step ST33, the d-axis current Id(n) (=MINId) corresponding to the smallest value MINId determined in step ST32 is selected and output as a selected d-axis current Ids.

Subsequent to step ST22 or ST33, the process proceeds to step ST34.

In step ST34, a determination is made as to whether any of the q-axis currents Iq(1), Iq(2), ..., Iq(N) of the N motors has exceeded the q-axis current command value Iq* (has become larger than the q-axis current command value Iq* for the first time since the start of the direct-current excitation).

If NO (if none of the q-axis currents Iq(1), Iq(2), ..., Iq(N) has exceeded the q-axis current command value Iq*), the process proceeds to step ST35, and if YES, the processing of steps ST23 and ST24 is performed.

In step ST35, the smallest value MINIq of the absolute values |Iq(1)|, |Iq(2)|, ..., |Iq(N)| of the respective q-axis currents Iq(1), Iq(2), ..., Iq(N) is determined.

In step ST36, the q-axis current Iq(n) (=MINIq) corresponding to the smallest value MINIq determined in step ST35 is selected and output as a selected q-axis current Iqs.

Upon completion of step ST24 or ST36, the process at the control period ends.

With the fourth embodiment, it is possible to reduce the time required for the d-axis current and the q-axis current to reach the command values.

As described in the first embodiment, instead of the configuration in which the q-axis current command value Iq* is fixed at zero, and the d-axis current command value Id* increases in a stepwise manner, it is possible to employ a configuration in which the d-axis current command value Id* is fixed at zero, and the q-axis current command value Iq* increases in a stepwise manner. In short, it is sufficient that a value fixed at zero be used as one of the d-axis current command value Id* and the q-axis current command value Iq*, and a value increasing in a stepwise manner be used as the other of the d-axis current command value Id* and the q-axis current command value Iq*.

Although a case where the number of motors driven in parallel is N in the first embodiment has been described with reference to FIG. 24, and a case where the number of motors driven in parallel is N in the fourth embodiment has been described with reference to FIG. 33, the second and third embodiments can also be applied to a case where the number of motors driven in parallel is N, through the same modification.

The above first, third, and fourth embodiments and the modifications thereof are configured so that a difference between a value of a DC current flowing through the first synchronous motor and a value of a DC current flowing through the second synchronous motor is reduced during the direct-current excitation.

Specifically, in performing the direct-current excitation, the controller determines, for each of the first and second synchronous motors, a d-axis current and a q-axis current corresponding to three-phase currents flowing through the synchronous motor, selects one of the d-axis currents of the first and second synchronous motors that is larger in absolute value than the other of the d-axis currents, selects one of the q-axis currents of the first and second synchronous motors that is larger in absolute value than the other of the q-axis currents, determines a d-axis voltage command value for making the selected d-axis current equal to a d-axis current command value, determines a q-axis voltage command value for making the selected q-axis current equal to a q-axis current command value, converts the d-axis voltage command value and the q-axis voltage command value to three-phase voltage command values, and controls the inverter to make output voltages of the inverter equal to the three-phase voltage command values.

In the second embodiment and the modifications thereof, in performing the direct-current excitation, the controller determines a d-axis current and a q-axis current corresponding to three-phase currents flowing through one of the first and second synchronous motors, determines a d-axis voltage command value for making the d-axis current equal to a d-axis current command value, determines a q-axis voltage command value for making the q-axis current equal to a q-axis current command value, converts the d-axis voltage command value and the q-axis voltage command value to three-phase voltage command values, and controls the inverter to make output voltages of the inverter equal to the three-phase voltage command values, wherein at least one of the d-axis current command value and the q-axis current command value increases gradually.

In that case, it may be configured so that a larger one of the value of the direct current flowing through the first synchronous motor and the value of the direct current flowing through the second synchronous motor approaches a smaller one of the values.

Alternatively, it may be configured so that a smaller one of the value of the direct current flowing through the first synchronous motor and the value of the direct current flowing through the second synchronous motor approaches a larger one of the values.

MODIFICATIONS

In the first to fourth embodiments, the phase currents flowing through each motor are measured by using current detection elements provided on connection lines connecting the output terminals of the inverter 30 and terminals of the windings of the first and second motors 7A and 7B, and the d-axis currents and the q-axis currents of the respective motors are calculated from the measured currents.

Figure 34:
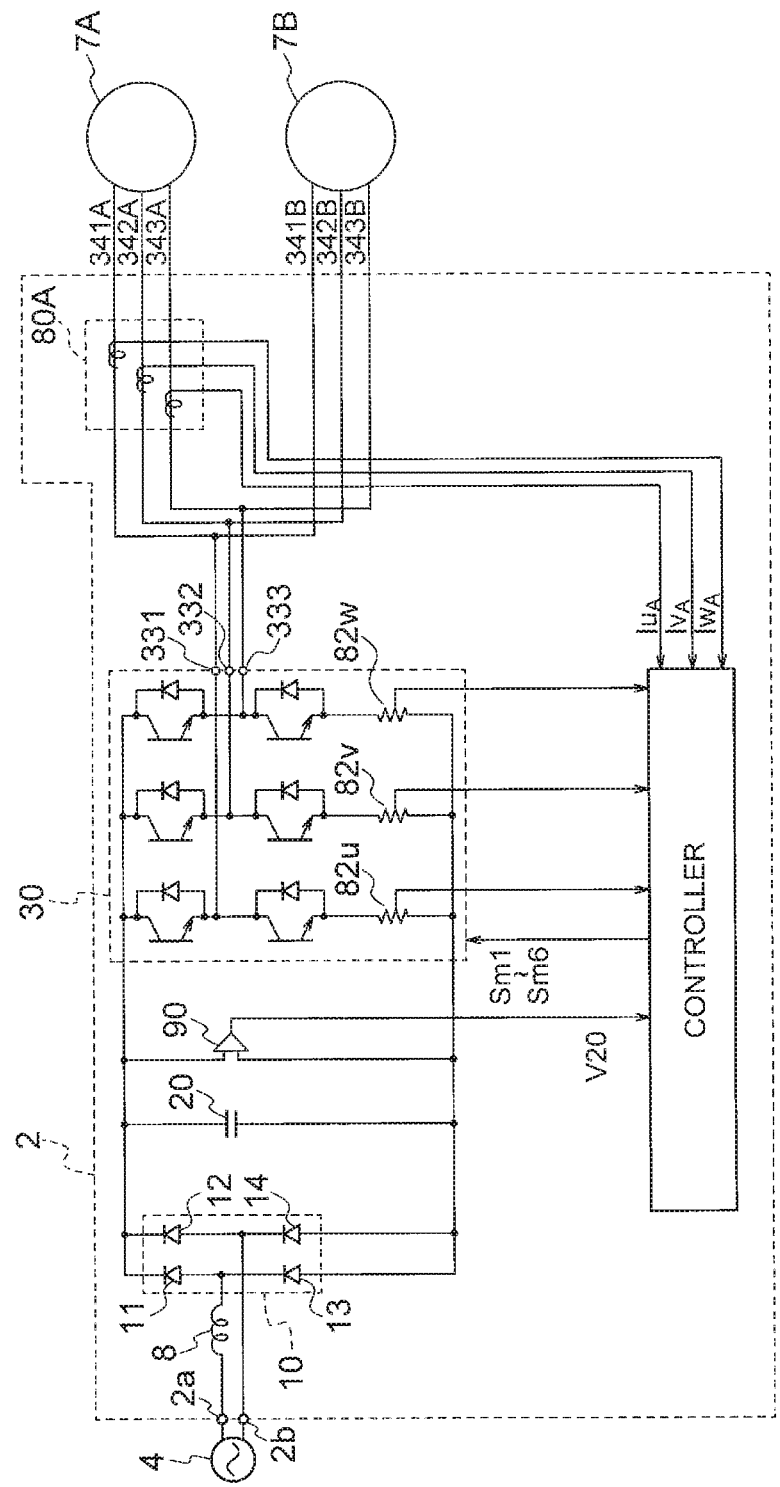
FIG. 34 is a schematic wiring diagram illustrating a modification of the motor driving apparatus of FIG. 1.

Alternatively, as illustrated in FIG. 34, it is possible to use current detection elements, e.g., shunt resistors 82u, 82v, and 82w, provided in lower arms of the inverter 30 to measure the currents (inverter currents) flowing through the respective arms, use a current detector 80A provided for one (e.g., the motor 7A) of the motors 7A and 7B to detect currents of the motor, subtract, from the currents of the respective phases of the inverter 30, the currents of the corresponding phases of the motor 7A to calculate the currents of the corresponding phases of the motor 7B, and calculate, for each of the motors 7A and 7B, the d-axis current and q-axis current of the motor from the calculated currents of the three phases.

Figure 35:
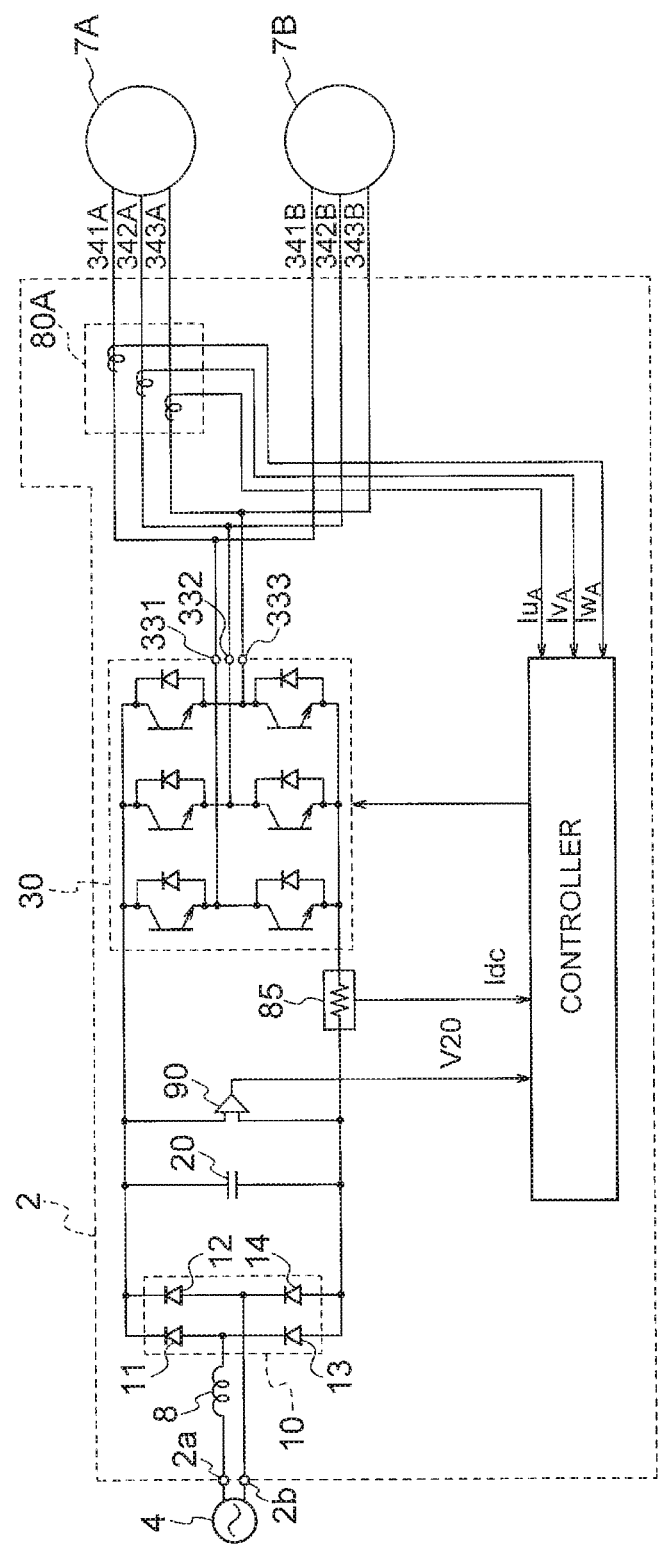
FIG. 35 is a schematic wiring diagram illustrating another modification of the motor driving apparatus of FIG. 1.

Also, as illustrated in FIG. 35, it is possible to use a current detection element, e.g., a shunt resistor 85, provided in a bus line to measure the current flowing through the bus line, calculate the inverter currents (the currents of the respective phases) based on the bus line current, use a current detector 80A provided for one (e.g., the motor 7A) of the motors 7A and 7B to detect currents of the motor, subtract, from the currents of the respective phases of the inverter 30, the currents of the corresponding phases of the motor 7A to calculate the currents of the corresponding phases of the motor 7B, and calculate, for each of the motors 7A and 7B, the d-axis current and q-axis current of the motor from the calculated currents of the three phases. The calculation of the inverter currents based on the bus line current can be implemented by, for example, the method described in Japanese Patent Application Publication No. 2005-229760.

In both the case of the configuration of FIG. 34 and the case of the configuration of FIG. 35, when the number of motors driven in parallel is N, it is possible that for each of (N−1) of the N motors, current detection elements are provided to detect the currents of the motor, and the currents of the remaining one of the N motors are calculated by subtracting the currents of the (N−1) motors from the inverter currents.

The configurations described in the above embodiments are examples of configurations of the present invention, and may be combined with other known techniques, and may be modified, e.g., by partial omission, without departing from the gist of the present invention.

The invention claimed is:

1. A motor driving apparatus comprising:
an inverter to drive a first synchronous motor and a second synchronous motor each including a rotor; and
a controller to control the inverter,
wherein
the controller pulls in the rotor of the first synchronous motor and the rotor of the second synchronous motor to a designated position by performing direct-current excitation prior to starting of the first synchronous motor and the second synchronous motor, and
in performing the direct-current excitation, the controller
determines, for each of the first and second synchronous motors, a d-axis current and a q-axis current corresponding to three-phase currents flowing through the synchronous motor,
selects one of the d-axis currents of the first and second synchronous motors that is larger in absolute value than the other of the d-axis currents,
selects one of the q-axis currents of the first and second synchronous motors that is larger in absolute value than the other of the q-axis currents,
determines a d-axis voltage command value for making the selected d-axis current equal to a d-axis current command value,
determines a q-axis voltage command value for making the selected q-axis current equal to a q-axis current command value,
converts the d-axis voltage command value and the q-axis voltage command value to three-phase voltage command values, and
controls the inverter to make output voltages of the inverter equal to the three-phase voltage command values.

2. The motor driving apparatus of claim 1, wherein
one of the d-axis current command value and the q-axis current command value is fixed at zero, and
the other of the d-axis current command value and the q-axis current command value increases in a stepwise manner.

3. The motor driving apparatus of claim 1, wherein the q-axis current command value is fixed at zero, and the d-axis current command value increases from zero in a stepwise manner.

4. The motor driving apparatus of claim 2, wherein
until any of the d-axis currents of the first and second synchronous motors exceeds the d-axis current command value, the controller selects one of the d-axis currents of the first and second synchronous motors that is smaller in absolute value than the other of the d-axis currents, and
until any of the q-axis currents of the first and second synchronous motors exceeds the q-axis current command value, the controller selects one of the q-axis currents of the first and second synchronous motors that is smaller in absolute value than the other of the q-axis currents.

5. The motor driving apparatus of claim 1, wherein at least one of the d-axis current command value and the q-axis current command value increases gradually.

6. The motor driving apparatus of claim 5, wherein at least one of the d-axis current command value and the q-axis current command value increases linearly.

7. The motor driving apparatus of claim 5, wherein the q-axis current command value is fixed at zero, and the d-axis current command value increases gradually from zero.

8. An air conditioner comprising the motor driving apparatus of claim 1.

9. A motor driving apparatus comprising:
an inverter to drive a first synchronous motor and a second synchronous motor each including a rotor; and
a controller to control the inverter,
wherein the controller pulls in the rotor of the first synchronous motor and the rotor of the second synchronous motor to a designated position by performing direct-current excitation prior to starting of the first synchronous motor and the second synchronous motor,
wherein in performing the direct-current excitation, the controller
determines a d-axis current and a q-axis current corresponding to three-phase currents flowing through one of the first and second synchronous motors,
determines a d-axis voltage command value for making the d-axis current equal to a d-axis current command value, determines a q-axis voltage command value for making the q-axis current equal to a q-axis current command value, converts the d-axis voltage command value and the q-axis voltage command value to three-phase voltage command values, and controls the inverter to make output voltages of the inverter equal to the three-phase voltage command values, and wherein at least one of the d-axis current command value and the q-axis current command value increases gradually.

10. The motor driving apparatus of claim 9, wherein at least one of the d-axis current command value and the q-axis current command value increases linearly.

11. The motor driving apparatus of claim 9, wherein the q-axis current command value is fixed at zero, and the d-axis current command value increases gradually from zero.

12. An air conditioner comprising the motor driving apparatus of claim 9.

* * * * *